United States Patent
Kobayashi et al.

(10) Patent No.: US 11,127,194 B2
(45) Date of Patent: Sep. 21, 2021

(54) IMAGE PROCESSING APPARATUS AND IMAGE PROCESSING METHOD

(71) Applicant: SONY CORPORATION, Tokyo (JP)

(72) Inventors: Goh Kobayashi, Tokyo (JP); Junichi Tanaka, Kanagawa (JP); Yuichi Araki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/332,507

(22) PCT Filed: Oct. 11, 2017

(86) PCT No.: PCT/JP2017/036769
§ 371 (c)(1),
(2) Date: Mar. 12, 2019

(87) PCT Pub. No.: WO2018/079260
PCT Pub. Date: May 3, 2018

(65) Prior Publication Data
US 2019/0266786 A1    Aug. 29, 2019

(30) Foreign Application Priority Data
Oct. 25, 2016 (JP) .............................. JP2016-208373

(51) Int. Cl.
*G06T 15/20* (2011.01)
*G06T 15/00* (2011.01)
(Continued)

(52) U.S. Cl.
CPC .............. *G06T 15/20* (2013.01); *G06T 15/00* (2013.01); *H04N 13/00* (2013.01); *H04N 13/111* (2018.05)

(58) Field of Classification Search
None
See application file for complete search history.

(56) References Cited

U.S. PATENT DOCUMENTS

2012/0212488 A1* 8/2012 Yu ......................... G06T 15/005
                                                         345/422
2013/0141550 A1* 6/2013 Pockett ................ H04N 13/178
                                                          348/51
(Continued)

FOREIGN PATENT DOCUMENTS

JP    2003-085584 A    3/2003
JP    2010-157826 A    7/2010
(Continued)

OTHER PUBLICATIONS

Moezzi et al., Virtual View Generation for 3D Digital Video, Immersive Telepresence, IEEE MultiMedia, Jan.-Mar. 1997, pp. 18-26, IEEE.

*Primary Examiner* — Yanna Wu
(74) *Attorney, Agent, or Firm* — Paratus Law Group, PLLC

(57) ABSTRACT

There is provided an image processing apparatus and an image processing method that are capable of improving the accuracy of a depth image of a 3D model. A depth image generation unit generates a depth image of a plurality of viewpoints for each object included in a 3D model. The present disclosure is applicable to, for example, an encoding device or the like configured to generate a color image and a depth image of each object of each of a plurality of viewpoints on the basis of 3D data of a 3D model, generate an encoded stream by encoding the images, and generate object range information indicating the range of each object.

15 Claims, 18 Drawing Sheets

(51) Int. Cl.
*H04N 13/111* (2018.01)
*H04N 13/00* (2018.01)

(56) References Cited

U.S. PATENT DOCUMENTS

| | | | |
|---|---|---|---|
| 2013/0208124 A1* | 8/2013 | Boghossian | G06K 9/3241 |
| | | | 348/159 |
| 2014/0348418 A1* | 11/2014 | Ishikawa | H04N 13/111 |
| | | | 382/154 |
| 2015/0269736 A1 | 9/2015 | Hannuksela et al. | |
| 2018/0061070 A1* | 3/2018 | Higuchi | G06T 7/13 |
| 2018/0096520 A1* | 4/2018 | Yoshimura | G06T 15/205 |

FOREIGN PATENT DOCUMENTS

| | | |
|---|---|---|
| JP | 2011-146762 A | 7/2011 |
| JP | 2013-197881 A | 9/2013 |
| JP | 2014-230251 A | 12/2014 |
| WO | WO 2004/071102 A1 | 8/2004 |

* cited by examiner

FIG. 8

| CAMERA ID | OBJECT ID | DEPTH IMAGE ID | COLOR IMAGE ID | umin | umax | vmin | vmax | zmin | zmax |
|---|---|---|---|---|---|---|---|---|---|
| 0 | 0 | 0 | 0 | | | | | | |
| | 1 | 1 | 1 | | | | | | |
| | 2 | 2 | 2 | | | | | | |
| 1 | 0 | 3 | 3 | | | | | | |
| | 1 | 4 | 4 | | | | | | |
| | 2 | 5 | 5 | | | | | | |

| CAMERA ID | OBJECT ID | DEPTH IMAGE ID | COLOR IMAGE ID |
|---|---|---|---|
| 0 | 0 | 0 | 0 |
|  | 1 | 1 | 1 |
|  | 2 | 2 | 2 |
| 1 | 0 | 3 | 3 |
|  | 1 | 4 | 4 |
|  | 2 | 5 | 5 |

B

| OBJECT ID | Xmin | Xmax | Ymin | Ymax | Zmin | Zmax |
|---|---|---|---|---|---|---|
| 0 | | | | | | |
| 1 | | | | | | |
| 2 | | | | | | |

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2017/036769 (filed on Oct. 11, 2017) under 35 U.S.C. § 371, which claims priority to Japanese Patent Application No. 2016-208373 (filed on Oct. 25, 2016), which are all hereby incorporated by reference in their entirety.

TECHNICAL FIELD

The present disclosure relates to an image processing apparatus and an image processing method, and particularly relates to an image processing apparatus and an image processing method that are capable of improving the accuracy of a 3D model depth image.

BACKGROUND ART

There is the technology of generating a 3D model of a subject from color images and depth images captured by a plurality of cameras (refer to Non Patent Document 1, for example).

CITATION LIST

Non-Patent Document

Non-Patent Document 1: Saied Moezzi, Li-Cheng Tai, Philippe Gerard, "Virtual View Generation for 3D Digital Video", University of California, San Diego SUMMARY OF THE INVENTION

Problems to be Solved by the Invention

However, improvement of the accuracy of a 3D model depth image has not been considered.

The present disclosure has been made in view of such a circumstance and is intended to improve the accuracy of a 3D model depth image.

Solutions to Problems

An image processing apparatus according to a first aspect of the present disclosure is an image processing apparatus including a depth image generation unit configured to generate a depth image of each of a plurality of viewpoints for each object included in a 3D model.

An image processing method according to a first aspect of the present disclosure corresponds to the image processing apparatus according to the first aspect of the present disclosure.

In the first aspect of the present disclosure, a depth image of each of a plurality of viewpoints is generated for each object included in a 3D model.

An image processing apparatus according to a second aspect of the present disclosure is an image processing apparatus including an object generation unit configured to generate an object on the basis of a depth image of each of a plurality of viewpoints for the object included in a 3D model.

An image processing method according to a second aspect of the present disclosure corresponds to the image processing apparatus according to the second aspect of the present disclosure.

In the second aspect of the present disclosure, an object is generated on the basis of a depth image of each of a plurality of viewpoints for the object included in a 3D model.

Note that the image processing apparatuses according to the first and second aspects can be achieved by a computer executing a computer program.

Furthermore, to achieve the image processing apparatuses according to the first and second aspects, the computer program executed by the computer can be provided by being transmitted through a transmission medium or being recorded on a recording medium.

Effects of the Invention

According to a first aspect of the present disclosure, the accuracy of a depth image of a 3D model can be improved.

Furthermore, according to a second aspect of the present disclosure, a 3D model can be generated on the basis of a depth image of a 3D model having an improved accuracy.

Note that the effects described herein are not necessarily limited, and may be any of effects described in the present disclosure.

BRIEF DESCRIPTION OF DRAWINGS

FIG. 8 is a diagram illustrating an exemplary object table in the first embodiment.

FIG. 15 is a diagram illustrating an exemplary object table in the second embodiment.

MODE FOR CARRYING OUT THE INVENTION

Figure 18:
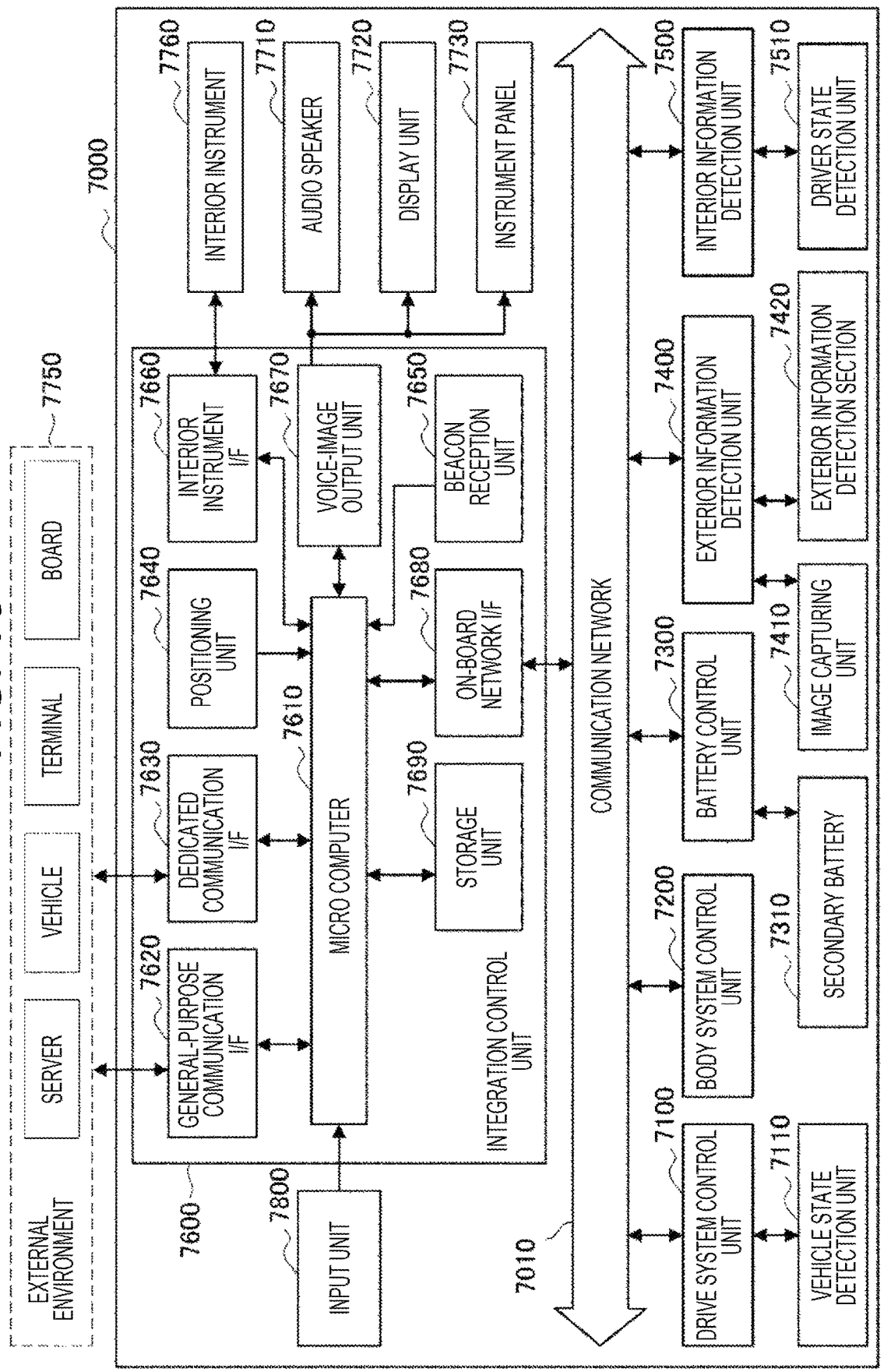
FIG. 18 is a block diagram illustrating an exemplary schematic configuration of a vehicle control system.
Figure 19:
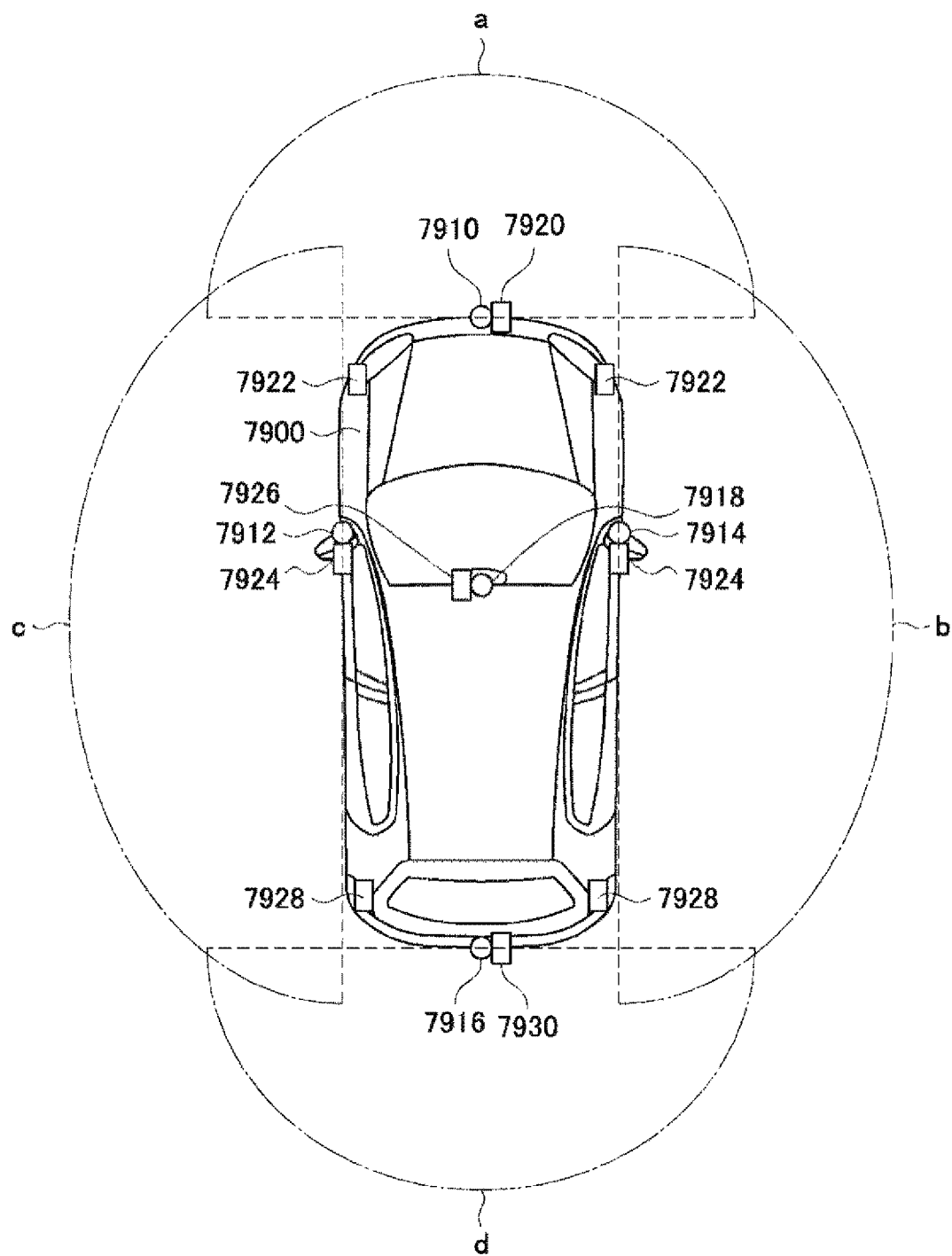
FIG. 19 is an explanatory diagram illustrating exemplary installation positions of an exterior information detection section and an image capturing unit.

Hereinafter, modes (hereinafter referred to as embodiments) for implementing the present disclosure will be described. Note that the description will be given in the following order.
1. First embodiment: image processing system (FIGS. 1 to 12)
2. Second embodiment: image processing system (FIGS. 13 to 16)
3. Third embodiment: computer (FIG. 17)
4. Exemplary application: vehicle control system (FIGS. 18 and 19)

First Embodiment (Exemplary Configuration of Image Processing System)

Figure 1:
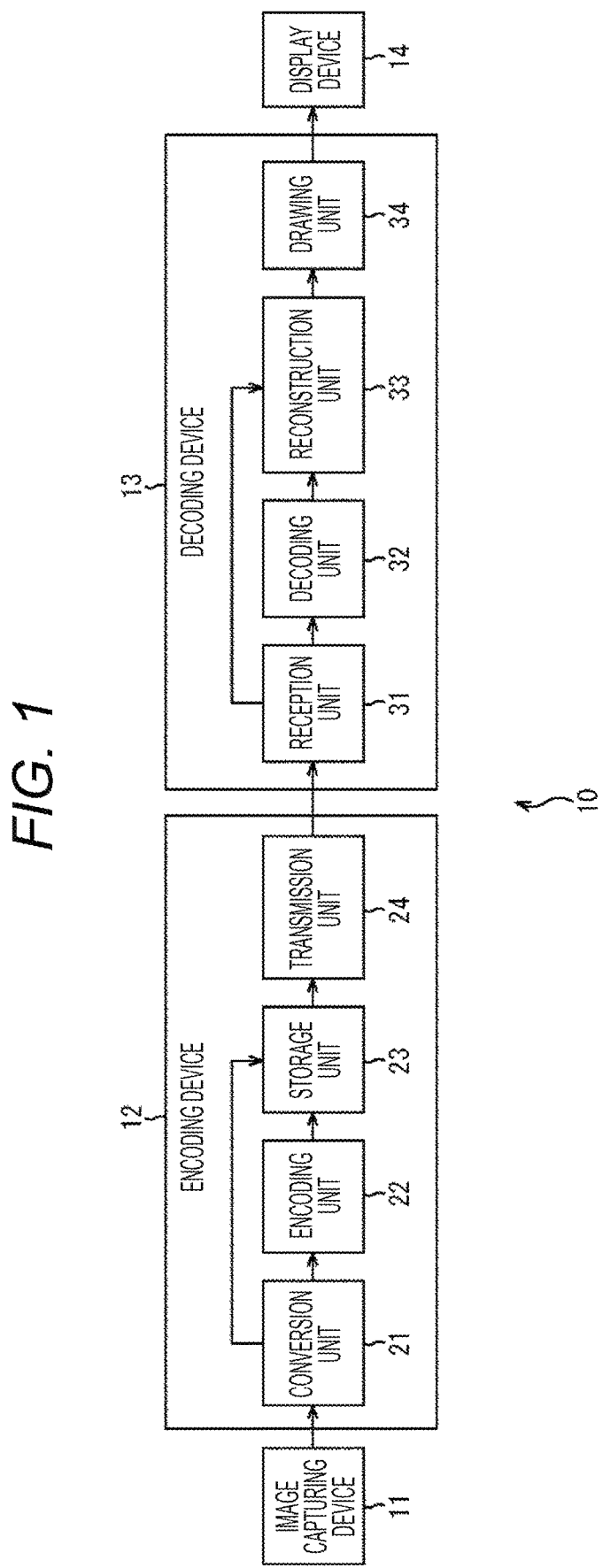
FIG. 1 is a block diagram illustrating an exemplary configuration of an image processing system to which the present disclosure is applied according to a first embodiment.

FIG. 1 is a block diagram illustrating an exemplary configuration of an image processing system to which the present disclosure is applied according to a first embodiment.

An image processing system 10 in FIG. 1 includes an image capturing device 11, an encoding device 12 (image processing apparatus), a decoding device 13 (image processing apparatus), and a display device 14. The image processing system 10 generates a color image of a display viewpoint by using a color image and a depth image acquired by the image capturing device 11, and displays the color image.

Specifically, the image capturing device 11 of the image processing system 10 includes, for example, a multi-camera, a distance measurement measuring device, and an image processing unit. The multi-camera of the image capturing device 11 includes a plurality of cameras and captures, through the cameras, a moving image of color images of a subject, at least part of each of which is common. The distance measurement measuring device is, for example, provided to each camera, and generates a moving image of a depth image of a viewpoint same as that of the camera.

The image processing unit of the image capturing device 11 generates a 3D model of a subject by calculating, for each frame, Visual Hull or the like by using moving images of a color image and a depth image of the viewpoint of each camera and external and internal parameters on the world coordinate system (3D coordinate system) of each camera. The image processing unit generates, as 3D data of the subject, shape information (geometry) indicating the three-dimensional position of each apex (vertex) of each polygon mesh constituting the 3D model and connection between the apexes m, and color information of the polygon mesh.

The method of 3D data generation at the image processing unit may be a method disclosed in, for example, Non Patent Document 1 and the like. Note that the 3D data may include the shape information and a color image of the viewpoint of each camera. The image processing unit supplies the 3D data to the encoding device 12.

The encoding device 12 includes a conversion unit 21, an encoding unit 22, a storage unit 23, and a transmission unit 24.

The conversion unit 21 of the encoding device 12 divides the 3D model of the subject into one or more objects for each frame on the basis of the 3D data supplied from the image capturing device 11. Furthermore, for each frame, the conversion unit 21 determines, on the basis of the 3D data of the frame and the previous frame, the viewpoint of each virtual camera corresponding to a generated depth image so that temporal change of the position of a main object on the generated depth image of each virtual camera decreases. In this example, the viewpoints of virtual cameras corresponding to the generated depth image and a color image are same, but virtual cameras corresponding to the depth image and the color image and the number of virtual cameras may differ.

The conversion unit 21 generates external and internal parameters on the world coordinate system of the virtual camera of each determined viewpoint. Furthermore, the conversion unit 21 applies, to each virtual camera, a camera ID unique to the virtual camera. The conversion unit 21 generates a color image of each object of each frame captured by each virtual camera, and a depth image corresponding to the color image on the basis of external and internal parameters of the virtual camera and 3D data of the object of the frame.

For example, Masayuki Tanimoto, "Toward the Ultimate Video Communication" Technical report of IEICE, CS, Communication method 110 (323), 73-78, 2010-11-25 and the like can be adopted as a method of generating color images and depth images from 3D data.

The conversion unit 21 supplies the color image and the depth image of each object of each virtual camera to the encoding unit 22. Furthermore, the conversion unit 21 supplies the external parameter, the internal parameter, and the camera ID of each virtual camera to the storage unit 23 as virtual viewpoint information.

In addition, the conversion unit 21 generates, as object information for each object, for example, object range information indicating the range of the object, and a color image ID and a depth image ID corresponding to the object. The color image ID is an ID unique to the color image, and the depth image ID is an ID unique to the depth image. The conversion unit 21 generates an object table to which the object information of each object is registered. The conversion unit 21 supplies the object table to the storage unit 23.

The encoding unit 22 encodes the color image and the depth image of each object of each virtual camera, which are supplied from the conversion unit 21. The encoding scheme may be, for example, an Advanced Video Coding (AVC) scheme or a High Efficiency Video Coding (HEVC) scheme. The encoding unit 22 supplies, to the storage unit 23, an encoded stream obtained through the encoding.

The storage unit 23 stores the virtual viewpoint information and the object table supplied from the conversion unit 21, and the encoded stream supplied from the encoding unit 22.

The transmission unit 24 reads, as metadata, the virtual viewpoint information and the object table stored in the storage unit 23 and transmits the metadata to the decoding device 13, and also reads the encoded stream and transmits the encoded stream to the decoding device 13.

The decoding device 13 includes a reception unit 31, a decoding unit 32, a reconstruction unit 33, and a drawing unit 34. External and internal parameters on the world coordinate system of a display viewpoint are input to the decoding device 13 by a user viewing the display device 14, and supplied to the drawing unit 34 as display viewpoint information.

The reception unit 31 of the decoding device 13 receives the virtual viewpoint information, the object table, and the encoded stream transmitted from the transmission unit 24 of the encoding device 12. The reception unit 31 supplies the virtual viewpoint information and the object table to the reconstruction unit 33, and supplies the encoded stream to the decoding unit 32.

The decoding unit 32 decodes the encoded stream supplied from the reception unit 31 by a scheme corresponding to the encoding scheme at the encoding unit 22. The decoding unit 32 supplies the color image and the depth image of each object of each virtual camera, which are obtained as a result, to the reconstruction unit 33.

Similarly to the image processing unit of the image capturing device 11, the reconstruction unit 33 (object generation unit) reconstructs (generates) 3D data of each object on the basis of the object table, the color image and the depth image of each object of each virtual camera, and the virtual viewpoint information. The reconstruction unit 33 supplies the 3D data of each object to the drawing unit 34.

Similarly to the conversion unit 21, the drawing unit 34 generates, on the basis of the display viewpoint information and the 3D data of each object supplied from the reconstruction unit 33, a color image obtained through image capturing of all objects at the display viewpoint as a display image. The drawing unit 34 supplies the display image to the display device 14.

The display device 14 includes, for example, a two-dimensional head-mounted display (HMD) or a two-dimensional monitor. The display device 14 two-dimensionally displays the display image on the basis of the display image supplied from the reconstruction unit 33.

Note that the display device 14 may include a three-dimensional head-mounted display, a three-dimensional monitor, or the like. In this case, similarly to the conversion unit 21, the drawing unit 34 generates a depth image of the display viewpoint on the basis of the display viewpoint information and the 3D data of each object, and supplies the depth image to the display device 14. The display device 14 three-dimensionally displays the display image on the basis of the display image and the depth image supplied from the drawing unit 34.

Furthermore, in the example illustrated in FIG. 1, the reconstruction unit 33 generates the 3D data of all objects included in the 3D model, but may generate only the 3D data of a predetermined object specified by a viewer or the like among all objects included in the 3D model.

(Exemplary Configuration of Conversion Unit)

Figure 2:
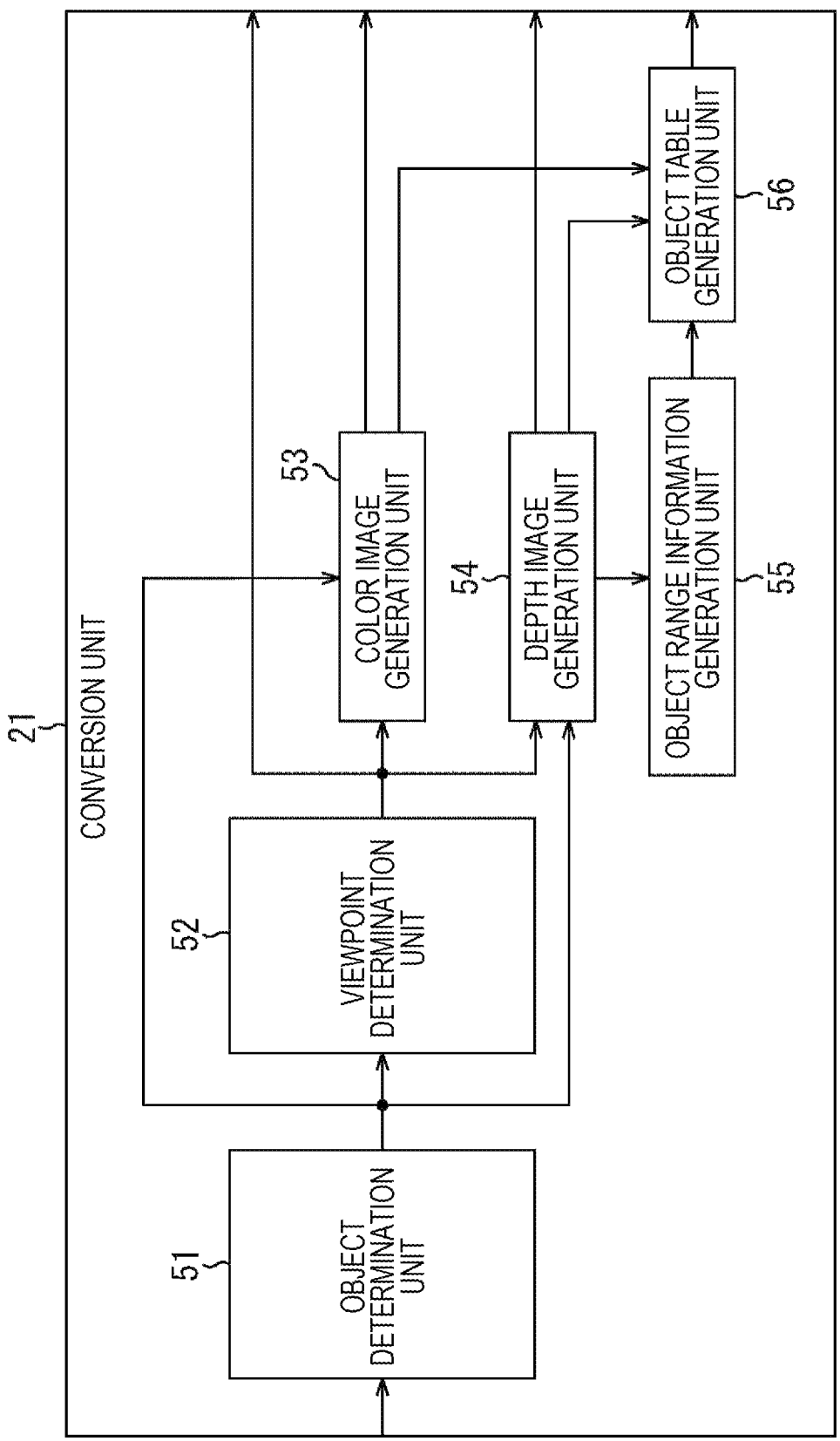
FIG. 2 is a block diagram illustrating an exemplary configuration of a conversion unit.

FIG. 2 is a block diagram illustrating an exemplary configuration of the conversion unit 21 in FIG. 1.

The conversion unit 21 in FIG. 2 includes an object determination unit 51, a viewpoint determination unit 52, a color image generation unit 53, a depth image generation unit 54, an object range information generation unit 55, and an object table generation unit 56.

The object determination unit 51 of the conversion unit 21 divides the 3D model of the subject into one or more objects for each frame on the basis of the 3D data supplied from the image capturing device 11 in FIG. 1. Furthermore, the object determination unit 51 applies, to each object, an object ID unique to the object. The object determination unit 51 supplies, for each frame, the 3D data and the object ID of each object in association with each other to the viewpoint determination unit 52, the color image generation unit 53, and the depth image generation unit 54.

The viewpoint determination unit 52 holds the 3D data and the object ID of each object of the previous frame of the current frame while associating the 3D data with the object ID. Furthermore, the viewpoint determination unit 52 holds the virtual viewpoint information of the previous frame of the current frame. The viewpoint determination unit 52 selects, for each frame, one main object from among all objects on the basis of the 3D data of each object supplied from the object determination unit 51. Then, the viewpoint determination unit 52 recognizes the object ID of the selected main object on the basis of the correspondence relation between the 3D data and the object ID of each object supplied from the object determination unit 51.

The viewpoint determination unit 52 reads 3D data of the main object of the previous frame on the basis of the recognized object ID of the main object and the held correspondence relation between the 3D data and the object ID of each object of the previous frame. The viewpoint determination unit 52 determines viewpoints of a plurality of virtual cameras corresponding to the depth image of the current frame generated by the depth image generation unit 54, on the basis of the read 3D data of the main object of the previous frame, the virtual viewpoint information, and 3D data of the main object of the current frame.

Specifically, the viewpoint determination unit 52 changes, for each virtual camera, the viewpoint of the virtual camera of the previous frame so that temporal change of the position of the main object on the depth image of the current frame generated by the depth image generation unit 54 decreases, and determines the changed viewpoint of the virtual camera as the viewpoint of the virtual camera of the current frame.

The viewpoint determination unit 52 generates virtual viewpoint information of the virtual camera of each determined viewpoint, and supplies the virtual viewpoint information to the color image generation unit 53, the depth image generation unit 54, and the storage unit 23 in FIG. 1. Furthermore, the viewpoint determination unit 52 holds the virtual viewpoint information of the current frame. Further, the viewpoint determination unit 52 holds the 3D data and the object ID of each object while associating the 3D data with the object ID.

The color image generation unit 53 generates a color image of each virtual camera for each object on the basis of the 3D data of each object supplied from the object determination unit 51 and the virtual viewpoint information supplied from the viewpoint determination unit 52. The color image generation unit 53 supplies the color image of each object of each virtual camera to the encoding unit 22 in FIG. 1. Furthermore, the color image generation unit 53 applies a color image ID to each color image. The color image generation unit 53 supplies the color image ID of the color image of each object of each virtual camera, the camera ID of the virtual camera, and the object ID of the object in association to the object table generation unit 56.

The depth image generation unit 54 generates a depth image of each of a plurality of virtual cameras for each object on the basis of the 3D data of each object supplied from the object determination unit 51 and the virtual viewpoint information supplied from the viewpoint determination unit 52.

This depth image is, for example, an image in which a value obtained by quantizing a distance z between the object and the virtual camera corresponding to each pixel in the depth direction is the pixel value of this pixel. Furthermore, the step of the quantization of the distance z is a value obtained by dividing the range of the distance z in the depth image by the allowable range of a pixel value of the depth image.

The depth image generation unit 54 generates a depth image for each object, and thus, and thus the size of the range of the distance z in the depth image is equal to or smaller than the size of the range of the distance z in the depth images of all objects. Accordingly, the range of the distance z in the depth image for each object is a range suitable for the object. Thus, the quantization step of the depth image of each object decreases as compared to the quantization step of the depth images of all objects. As a result, the accuracy of the depth image of each object improves as compared to the accuracy of each object in the depth images of all objects.

The depth image generation unit 54 supplies the depth image of each object of each virtual camera to the encoding unit 22 in FIG. 1. Furthermore, the depth image generation unit 54 applies a depth image ID to each depth image. The depth image generation unit 54 supplies the depth image ID of the depth image of each object of each virtual camera, the camera ID of the virtual camera, and the object ID of the object in association to the object table generation unit 56.

Furthermore, the depth image generation unit 54 generates two-dimensional position information indicating the range of the two-dimensional position of an object on each depth image. In addition, the depth image generation unit 54 generates a minimum value zmin and a maximum value zmax of the distance z indicating the range of the distance z used to generate each depth image. The depth image generation unit 54 supplies the two-dimensional position information, the minimum value zmin, and the maximum value zmax of each depth image to the object range information generation unit 55 in association with the object ID and the camera ID corresponding to the depth image.

The object range information generation unit 55 generates, as object range information for each object ID and each camera ID, the two-dimensional position information, the minimum value zmin, and the maximum value zmax supplied from the depth image generation unit 54, and supplies the object range information to the object table generation unit 56.

The object table generation unit 56 generates a table registering, in association with an object ID and a camera ID, the color image ID, the depth image ID, and the object range information corresponding to the object ID and the camera ID. The object table generation unit 56 supplies the generated table to the storage unit 23 in FIG. 1 as an object table that is a table related to an object.

As described above, the conversion unit 21 changes the viewpoint of the depth image so that variation of the position of the main object on the depth image between frames decreases. Thus, even in a case where the main object is moving, the conversion unit 21 can generate a depth image in which a pixel value corresponding to the main object always exists at a substantially same position. As a result, it is likely that a motion vector included in the encoded stream when the depth image is encoded by the encoding unit 22 decreases, and the compression ratio of the depth image improves.

(Description of Virtual Camera Viewpoint Determination Method)

Figure 3:
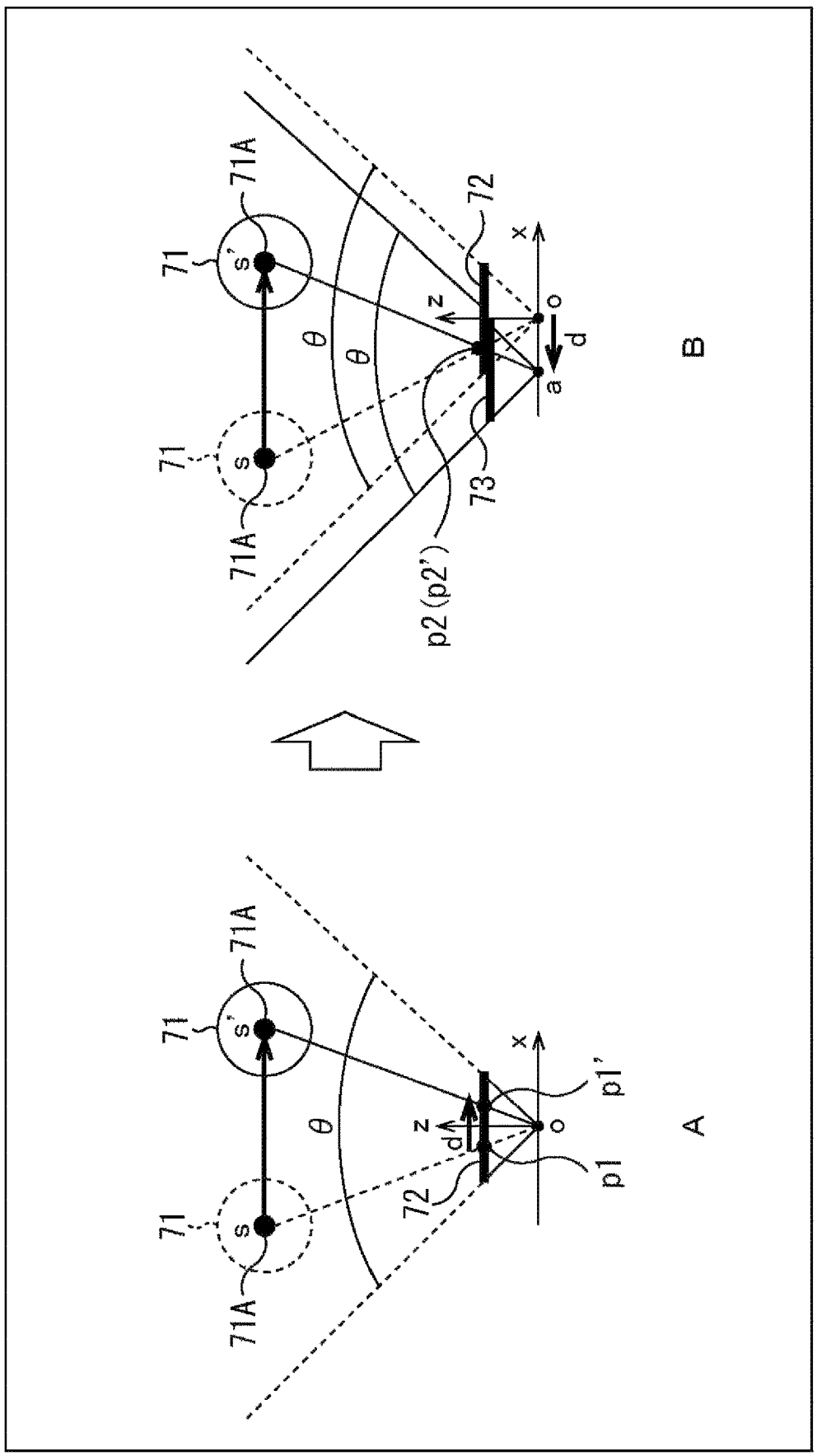
FIG. 3 is a diagram for description of a virtual camera viewpoint determination method.

FIG. 3 is a diagram for description of the method of virtual camera viewpoint determination by the viewpoint determination unit 52 in FIG. 2.

The viewpoint determination unit 52 determines the main object to be one of a plurality of objects on the basis of 3D data of the plurality of objects supplied from the object determination unit 51. Specifically, the viewpoint determination unit 52 determines the main object to be an object having a largest bounding box among the plurality of objects. In the example illustrated in FIG. 3, the main object is an object 71.

Subsequently, the viewpoint determination unit 52 generates the main object 71 on the world coordinate system on the basis of 3D data of the object 71 supplied from the object determination unit 51. In the example illustrated in FIG. 3, the angle of view of the virtual camera in the X direction between the current frame and the previous frame is an angle $\theta$. Furthermore, at the current frame, the object 71 moves in the x direction (the right direction in the drawing) in the camera coordinate system of a predetermined virtual camera of the previous frame, and a three-dimensional position s of a barycenter 71A of the object 71 on the world coordinate system moves to a three-dimensional position s'. The camera coordinate system is an xyz coordinates having an origin o at a three-dimensional position on the world coordinate system of the virtual camera, and a z direction in the depth direction of the virtual camera.

In this case, as illustrated in A of FIG. 3, when the virtual camera existing at the origin o of the previous frame is used as the virtual camera of the current frame, a position p1 of the object 71 on a depth image 72 of the virtual camera moves in the x direction to become a position p1'.

Thus, the viewpoint determination unit 52 projects the barycenter 71A of the object 71 onto the depth image 72 on the basis of the 3D data of the object 71 of the current frame. Furthermore, the viewpoint determination unit 52 projects the barycenter 71A onto the depth image 72 on the basis of the 3D data of the object 71 of the previous frame of the current frame. Then, the viewpoint determination unit 52 calculates a translation movement amount d from the position p1 of the barycenter 71A of the previous frame to the position p1' of the barycenter 71A of the current frame on the depth image 72 in the x direction. Then, the viewpoint determination unit 52 cancels movement of the object 71 in the x direction by determining the viewpoint of the virtual camera of the depth image of the current frame to be a viewpoint a translated by the translation movement amount d from the origin o in a direction opposite to the x direction.

As a result, as illustrated in B of FIG. 3, the difference between a position p2 of the barycenter 71A on the depth image 72 having a viewpoint at the origin o and a position p2' of the barycenter 71A on a depth image 73 of the viewpoint a is substantially zero. The viewpoint determination unit 52 moves the viewpoint of any other virtual camera in a similar manner.

As described above, the viewpoint determination unit 52 reduces temporal change of the position of the barycenter 71A on a depth image by moving, on the basis of motion of the object 71, the viewpoint of a virtual camera to cancel the motion.

(Exemplary Configuration of Depth Image Generation Unit)

Figure 4:
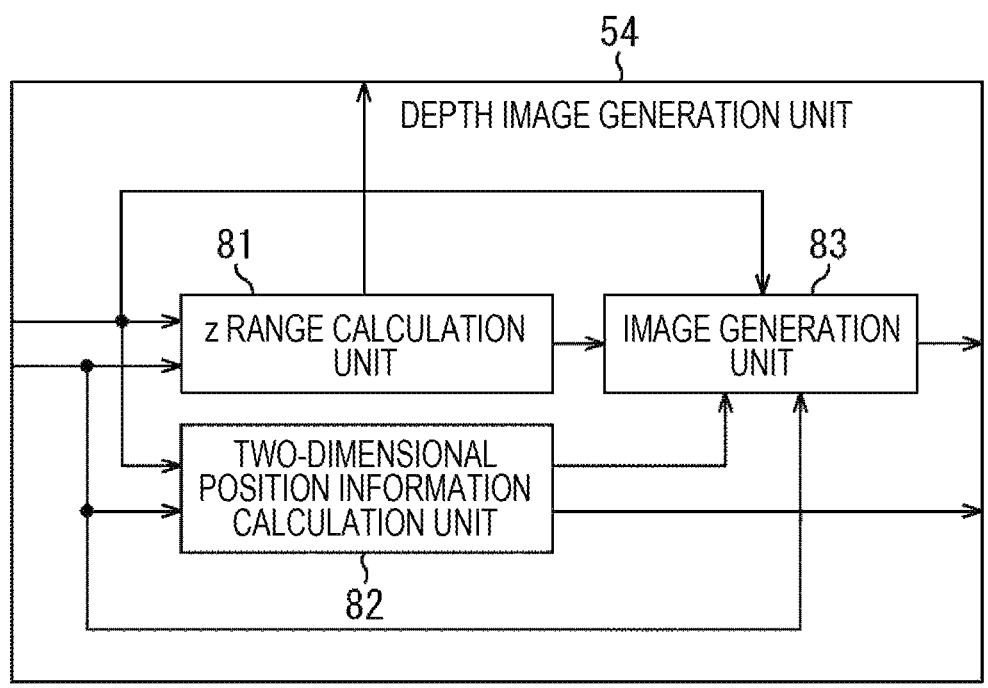
FIG. 4 is a block diagram illustrating an exemplary configuration of a depth image generation unit.

FIG. 4 is a block diagram illustrating an exemplary configuration of the depth image generation unit 54 in FIG. 2.

The depth image generation unit 54 in FIG. 4 includes a z range calculation unit 81, a two-dimensional position information calculation unit 82, and an image generation unit 83. The 3D data and object ID of each object supplied from the object determination unit 51 in FIG. 2 and the virtual viewpoint information supplied from the viewpoint determination unit 52 are supplied to the z range calculation unit 81, the two-dimensional position information calculation unit 82, and the image generation unit 83.

The z range calculation unit 81 of the depth image generation unit 54 calculates, on the basis of the 3D data and virtual viewpoint information of each object, the minimum value zmin and the maximum value zmax in a depth image of each object of each virtual camera. The z range calculation unit 81 supplies the minimum value zmin and the maximum value zmax in each depth image to the object range information generation unit 55 in FIG. 2 in association with the object ID and the camera ID corresponding to the depth image. Furthermore, the z range calculation unit 81 supplies the minimum value zmin and the maximum value zmax for each object and each virtual camera to the image generation unit 83.

The two-dimensional position information calculation unit 82 calculates, on the basis of the 3D data and virtual viewpoint information of each object, two-dimensional position information of the object on the depth image of the object of the virtual camera. The two-dimensional position information calculation unit 82 supplies the two-dimensional position information of each depth image to the object range information generation unit 55 in FIG. 2 in association with the object ID and the camera ID corresponding to the depth image. Furthermore, the two-dimensional position information calculation unit 82 supplies the two-dimensional position information for each object and each virtual camera to the image generation unit 83.

The image generation unit 83 calculates, for each object and each virtual camera, the distance z of the object projected onto each pixel in a range indicated by the two-dimensional position information supplied from the two-dimensional position information calculation unit 82 on the basis of the 3D data and virtual viewpoint information of the object. The image generation unit 83 quantizes, for each object and each virtual camera, the distance z of each pixel on the basis of the minimum value zmin and the maximum value zmax supplied from the z range calculation unit 81, and generates a pixel value. The image generation unit 83 generates, for each object and each virtual camera, a depth image in which the pixel value of each pixel in the range, on the depth image, indicated by the two-dimensional position information is the generated pixel value, and the pixel value of any other pixel is an optional fixed value, and supplies the depth image to the encoding unit 22 in FIG. 1.

Furthermore, the image generation unit 83 applies a depth image ID to each depth image. Then, the image generation unit 83 supplies the depth image ID of a depth image of each object of each virtual camera, the camera ID of the virtual camera, and the object ID of the object in association to the object table generation unit 56 in FIG. 2.

(Description of Depth Image of Each Object of Predetermined Virtual Camera)

Figure 5:
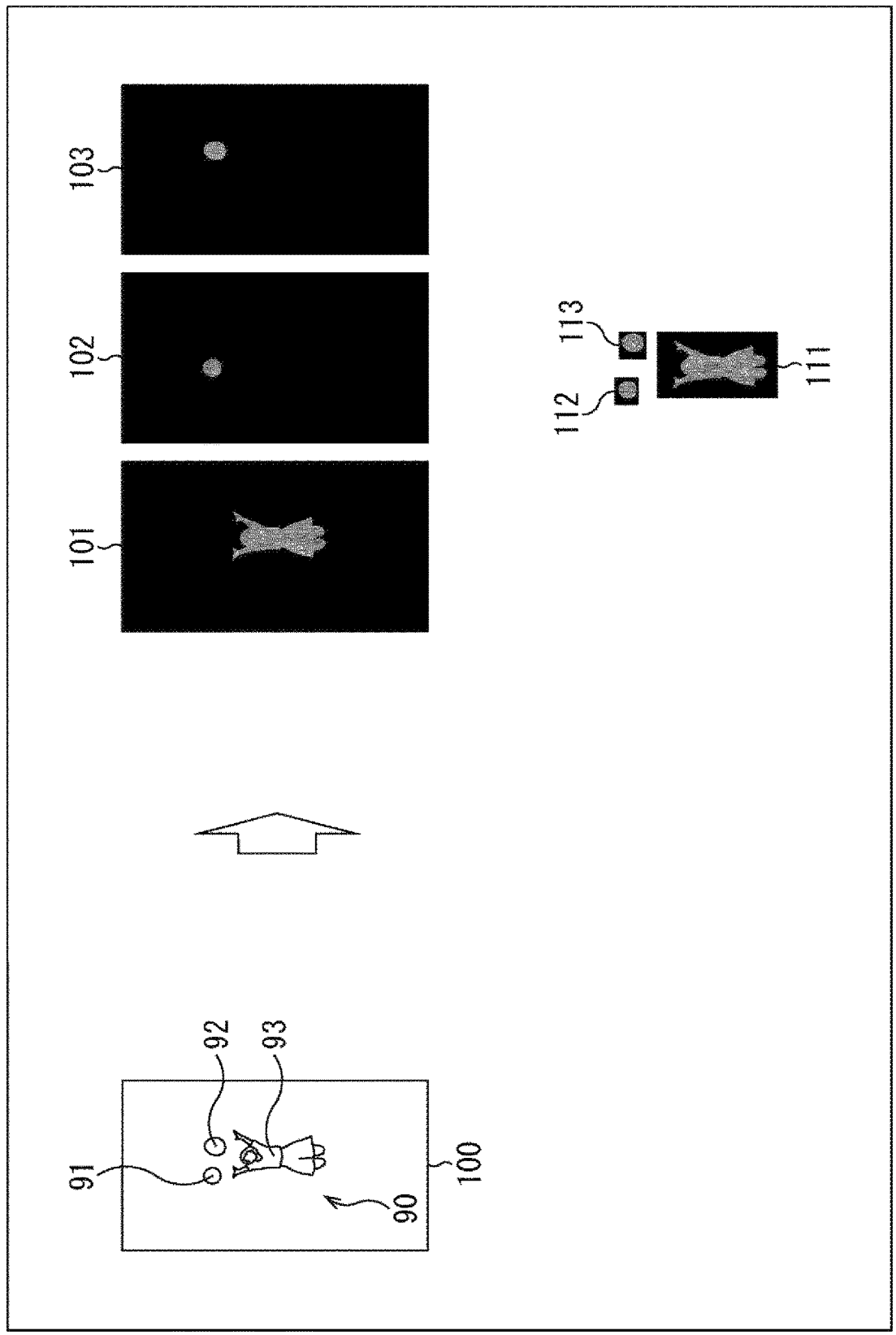
FIG. 5 is a diagram for description of a depth image of each object of a predetermined virtual camera.

FIG. 5 is a diagram for description of a depth image of each object of a predetermined virtual camera, which is generated by the depth image generation unit 54 in FIG. 2.

In the example illustrated in FIG. 5, a 3D model 90 of the subject is divided into three objects 91 to 93. Furthermore, a color image 100 is a color image of the entire 3D model 90 of the predetermined virtual camera.

In this case, the depth image generation unit 54 generates, on the basis of the 3D data and virtual viewpoint information of the object 91, a depth image 101, a pixel value of which in a region corresponding to the region of the object 91 on the color image 100 has a predetermined size (resolution) indicating the distance z of the object 91. The pixel value of any pixel of the depth image 101 other than a pixel, the pixel value of which expresses the distance z of the object 91 is an optional fixed value (zero in the example illustrated in FIG. 5).

Similarly, the depth image generation unit 54 generates a depth image 102 having a predetermined size on the basis of the 3D data and virtual viewpoint information of the object 92, and generates a depth image 103 having a predetermined size on the basis of the 3D data and virtual viewpoint information of the object 93.

Note that the size of a depth image may be different for each object. In this case, for example, the depth image generation unit 54 generates a depth image 111, a pixel value of which in a region corresponding to the region of the object 91 on the color image 100 indicates the distance z of the object 91 and that has a minimum rectangular shape including the region. Similarly, the depth image generation unit 54 generates a depth image 112 having a minimum rectangular shape including a region corresponding to the region of the object 91 on the color image 100, and a depth image 113 having a minimum rectangular shape including a region corresponding to the region of the object 91 on the color image 100.

In this case, the data amount of a depth image can be reduced as compared to a case where a depth image of the entire 3D model is generated. Thus, the encoding device 12 can reduce the transmission amount of the depth image.

(Description of Two-Dimensional Position Information)

Figure 6:
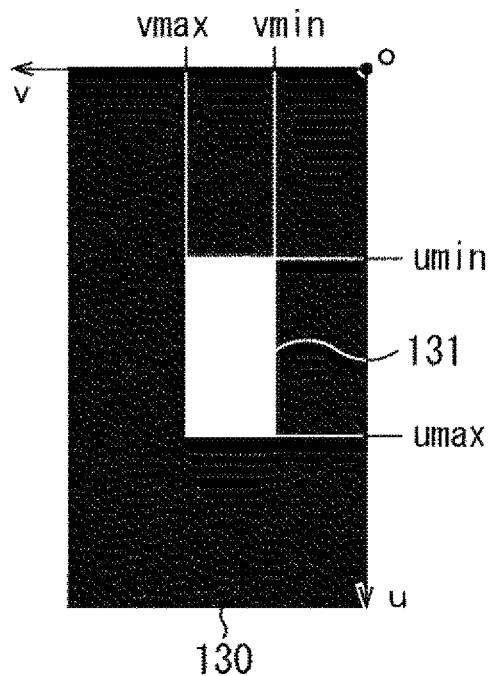
FIG. 6 is a diagram for description of two-dimensional position information.

FIG. 6 is a diagram for description of two-dimensional position information generated by the depth image generation unit 54 in FIG. 2.

As illustrated in FIG. 6, the two-dimensional position information of a depth image 130 includes a minimum value u min and a maximum value u max of the u coordinate and a minimum value v min and a maximum value v max of the v coordinate on the uv coordinate system of an object 131 on the depth image 130. The uv coordinate system is a two-dimensional coordinate system having the origin o at the upper-right position of the depth image, the v direction in the left direction, and the u direction in the downward direction.

(Description of Minimum Value Zmin and Maximum Value Zmax)

Figure 7:
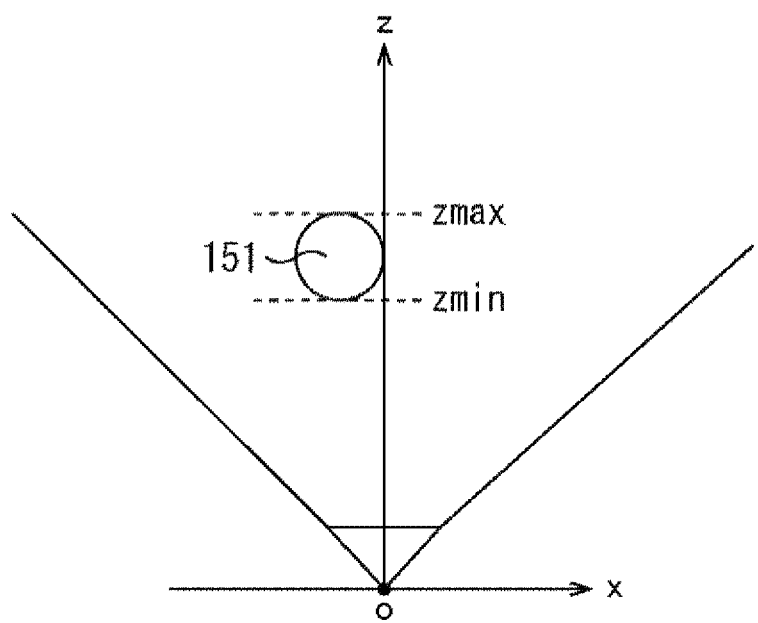
FIG. 7 is a diagram for description of a minimum value zmin and a maximum value zmax.

FIG. 7 is a diagram for description of the minimum value zmin and the maximum value zmax.

As illustrated in FIG. 7, the minimum value zmin and the maximum value zmax used to quantize the pixel value of a depth image of an object 151 of a predetermined virtual camera are the minimum value and the maximum value of the z coordinate of the object 151 on the camera coordinate system of the virtual camera.

(First Example of Object Table)

FIG. 8 is a diagram illustrating an exemplary object table generated by the object table generation unit 56 in FIG. 2.

As illustrated in FIG. 8, in the object table, a depth image ID, a color image ID, and object range information are registered in association with a camera ID and an object ID.

In the example illustrated in FIG. 8, the number of virtual cameras of a color image and a depth image is two, and the camera IDs of the two virtual cameras are 0 and 1. Furthermore, the number of objects is three, and the object IDs of the three objects are 0, 1, and 2. Thus, the number of color images and the number of depth images are each six (=2×3).

Furthermore, the depth image IDs of the depth images of the objects having the object IDs of 0, 1, and 2 and the virtual camera having the camera ID of 0 and the color image IDs of the color images thereof are 0, 1, and 2. In addition, the depth images ID of the depth images of the objects having the object IDs of 0, 1, and 2 and the virtual camera having the camera ID of 1 and the color image IDs of the color images thereof are 3, 4, and 5.

The decoding device 13 can recognize a three-dimensional region including each object on the camera coordinate system of each virtual camera on the basis of each object range information and each virtual viewpoint information registered to the object table. Thus, the decoding device 13 can recognize a three-dimensional region including each object on the world coordinate system on the basis of the virtual viewpoint information and the three-dimensional region including the object on the camera coordinate system of each virtual camera.

Thus, the decoding device 13 can reconstruct each object with the recognized three-dimensional region on the world coordinate system as a processing region by using a depth image and a color image of the object of each virtual camera. Thus, the object can be easily reconstructed as compared to a case where the object is reconstructed with the entire image capturing region of the virtual camera on the world coordinate system as a processing region.

Furthermore, the decoding device 13 can inversely quantize the pixel value of a depth image of each depth image ID into the distance z on the basis of the minimum value zmin and the maximum value zmax registered to the object table in association with the depth image ID.

(Description of Processing of Image Processing System)

Figure 9:
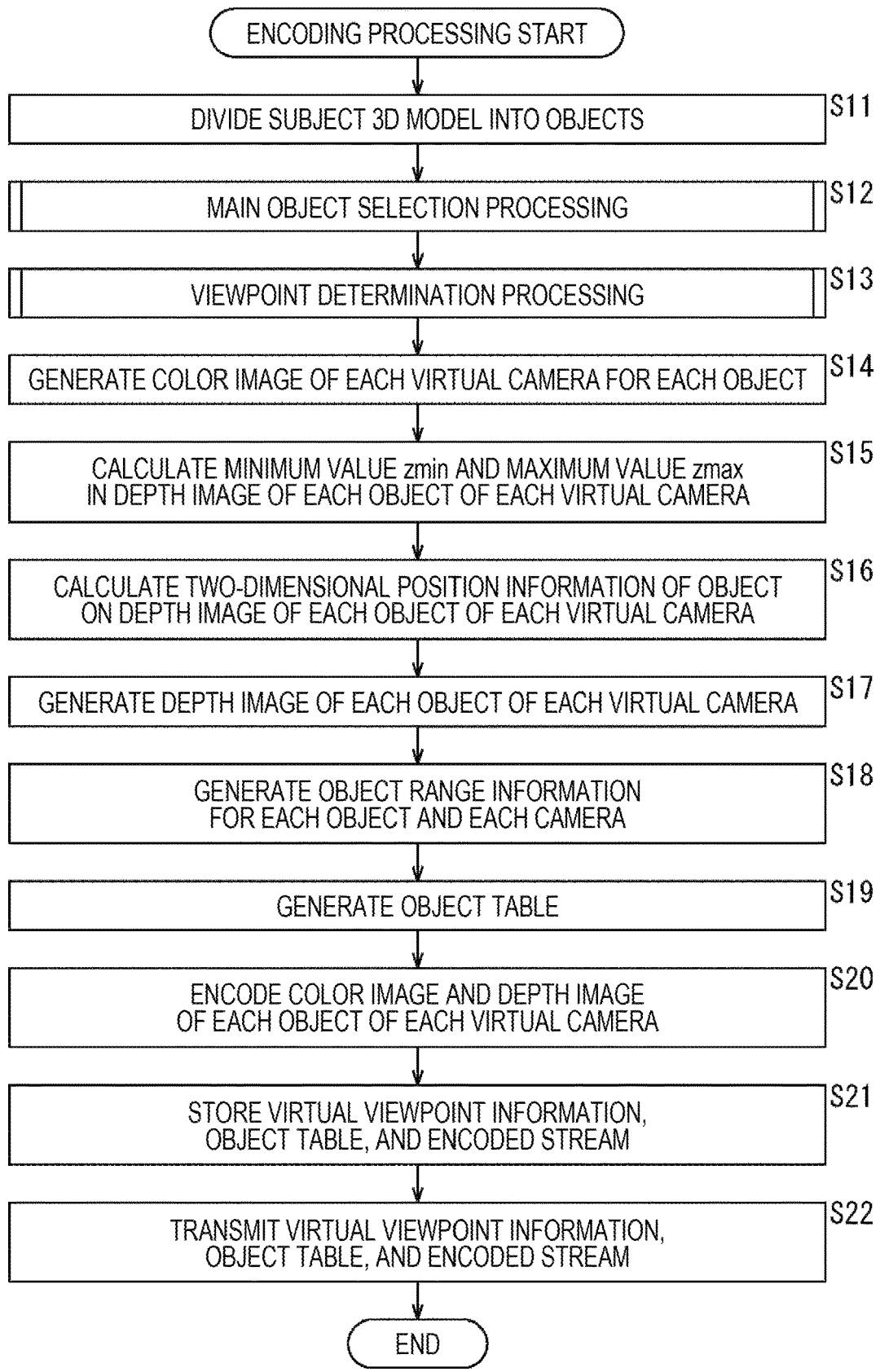
FIG. 9 is a flowchart for description of encoding processing in the first embodiment.

FIG. 9 is a flowchart for description of encoding processing by the encoding device 12 in FIG. 1. This encoding processing is started, for example, when 3D data of each frame is supplied from the image capturing device 11.

At step S11 in FIG. 9, the object determination unit 51 (FIG. 2) of the conversion unit 21 of the encoding device 12 divides the 3D model of the subject into one or more objects on the basis of the 3D data supplied from the image capturing device 11. Furthermore, the object determination unit 51 applies an object ID to each object. The object determination unit 51 supplies the 3D data and the object ID of each object to the viewpoint determination unit 52, the color image generation unit 53, and the depth image generation unit 54.

At step S12, the viewpoint determination unit 52 performs main object selection processing of selecting one main object from among all objects on the basis of the 3D data of each object supplied from the object determination unit 51. The main object selection processing will be described in detail later with reference to FIG. 10.

At step S13, the viewpoint determination unit 52 performs viewpoint determination processing of determining the viewpoint of each virtual camera corresponding to generated color and depth images. The viewpoint determination processing will be described in detail later with reference to FIG. 11.

At step S14, the color image generation unit 53 generates a color image of each virtual camera for each object on the basis of the 3D data of each object supplied from the object determination unit 51 and the virtual viewpoint information supplied from the viewpoint determination unit 52. The color image generation unit 53 supplies the color image of each object of each virtual camera to the encoding unit 22 in FIG. 1. Furthermore, the color image generation unit 53 applies a color image ID to each color image. The color image generation unit 53 supplies the color image ID of the color image of each object of each virtual camera, the camera ID of the virtual camera, and the object ID of the object in association to the object table generation unit 56.

At step S15, the z range calculation unit 81 (FIG. 4) of the depth image generation unit 54 calculates the minimum value zmin and the maximum value zmax in a depth image of each object of each virtual camera on the basis of the 3D data and virtual viewpoint information of each object. The z range calculation unit 81 supplies the minimum value zmin and the maximum value zmax in each depth image to the object range information generation unit 55 in association with the object ID and the camera ID corresponding to the depth image. Furthermore, the z range calculation unit 81 supplies the minimum value zmin and the maximum value zmax for each object and each virtual camera to the image generation unit 83.

At step S16, the two-dimensional position information calculation unit 82 calculates, on the basis of the 3D data and virtual viewpoint information of each object, two-dimensional position information of the object on the depth image of each object of each virtual camera. The two-dimensional position information calculation unit 82 supplies the two-dimensional position information of each depth image to the object range information generation unit 55 in association with the object ID and the camera ID corresponding to the depth image. Furthermore, the two-dimensional position information calculation unit 82 supplies the two-dimensional position information for each object and each virtual camera to the image generation unit 83.

At step S17, the image generation unit 83 generates a depth image of each object of each virtual camera on the basis of the 3D data and virtual viewpoint information of the object, and the minimum value zmin, the maximum value zmax, and the two-dimensional position information for the object and the virtual camera. The image generation unit 83 supplies the depth image of each object of each virtual camera to the encoding unit 22. Furthermore, the image generation unit 83 applies a depth image ID to each depth image. Then, the image generation unit 83 supplies the depth image ID of the depth image of each object of each virtual camera, the camera ID of the virtual camera, and the object ID of the object in association to the object table generation unit 56.

At step S18, the object range information generation unit 55 generates, as object range information, the two-dimensional position information, the minimum value zmin, and the maximum value zmax for each object ID and each camera ID, and supplies the object range information to the object table generation unit 56.

At step S19, the object table generation unit 56 generates an object table in which the color image ID, the depth image ID, and the object range information corresponding to an object ID and a camera ID are registered in association with the object ID and the camera ID. The object table generation unit 56 supplies the object table to the storage unit 23.

At step S20, the encoding unit 22 encodes the color image and the depth image of each object of each virtual camera. The encoding unit 22 supplies, to the storage unit 23, an encoded stream obtained through the encoding.

At step S21, the storage unit 23 stores the virtual viewpoint information, the object table, and the encoded stream.

At step S22, the transmission unit 24 reads the virtual viewpoint information, the object table, and the encoded stream stored in the storage unit 23, and transmits the virtual viewpoint information, the object table, and the encoded stream to the decoding device 13. Then, the processing ends.

Figure 10:
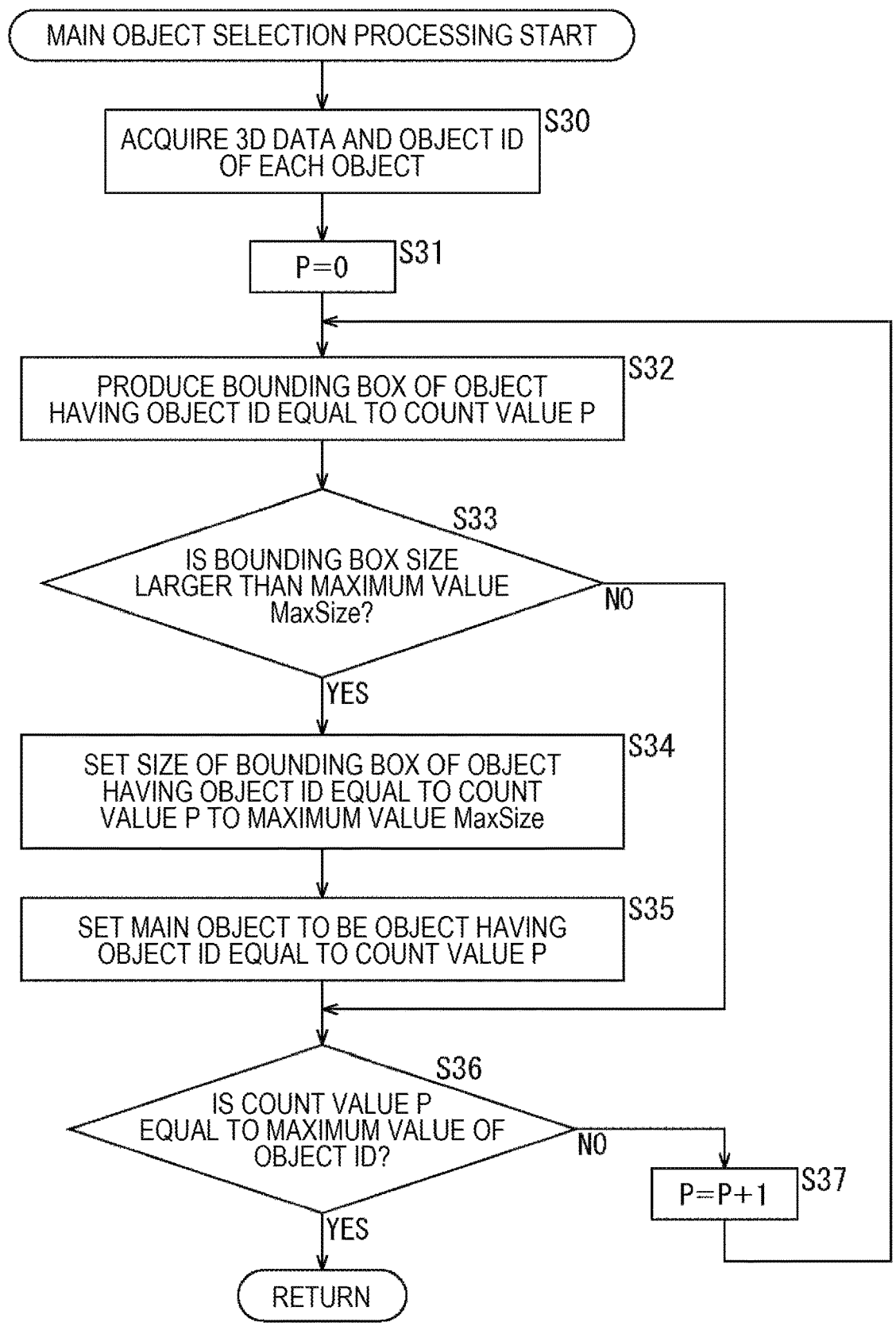
FIG. 10 is a flowchart for description of details of a main object selection processing.

FIG. 10 is a flowchart for description of details of the main object selection processing at step S12 in FIG. 9.

At step S30 in FIG. 10, the viewpoint determination unit 52 acquires the 3D data and object ID of each object from the object determination unit 51. At step S31, the viewpoint determination unit 52 sets a count value P to be zero.

At step S32, the viewpoint determination unit 52 produces, on the basis of 3D data of an object, the object ID of which acquired from the object determination unit 51 is equal to the count value P, the bounding box of the object on the world coordinate system.

At step S33, the viewpoint determination unit 52 determines whether or not the size of the bounding box produced at step S32 is larger than a maximum value Max Size. Note that the maximum value Max Size has an initial value of zero. Thus, in a case where the processing at step S34 is yet to be performed, the processing at step S33 determines that the size of the bounding box produced at step S32 is larger than the maximum value Max Size.

In a case where it is determined at step S33 that the size of the bounding box produced at step S32 is larger than the maximum value Max Size, the process proceeds to step S34.

At step S34, the viewpoint determination unit 52 sets the size of the bounding box of the object having an object ID equal to the count value P, which is produced at step S32 to be the maximum value Max Size.

At step S35, the viewpoint determination unit 52 sets the main object to be the object having an object ID equal to the count value P, and the process proceeds to step S36.

Meanwhile, in a case where it is determined at step S33 that the size of the bounding box produced at step S32 is not larger than the maximum value Max Size, the process proceeds to step S36.

At step S36, the viewpoint determination unit 52 determines whether or not the count value P is equal to the maximum value of the object ID. In a case where it is determined at step S36 that the count value P is not equal to the maximum value of the object ID, in other words, in a case where the processing at steps S32 to S35 is yet to be performed for all objects, the process proceeds to step S37.

At step S37, the viewpoint determination unit 52 increments the count value P by one, and the process returns to step S32. Accordingly, the processing at steps S32 to S37 is repeated until the count value P becomes equal to the maximum value of the object ID.

Meanwhile, in a case where it is determined at step S36 that the count value P is equal to the maximum value of the object ID, in other words, in a case where the processing at steps S32 to S35 is performed for all objects, the viewpoint determination unit 52 selects, as a definitive main object, the object set as the current main object. Then, the process returns to step S12 in FIG. 9, and proceeds to step S13.

Figure 11:
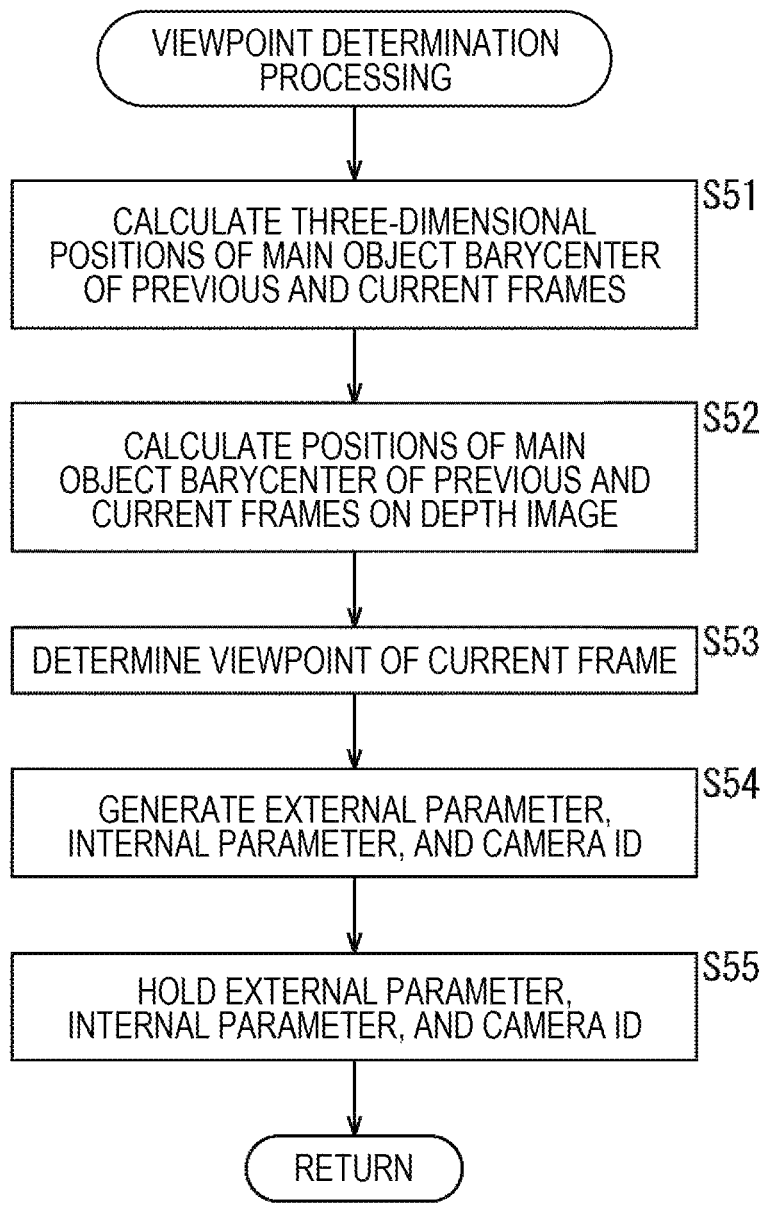
FIG. 11 is a flowchart for description of details of viewpoint determination processing.

FIG. 11 is a flowchart for description of details of the viewpoint determination processing at step S13 in FIG. 9. The viewpoint determination processing is performed, for example, for each virtual camera.

At step S51 in FIG. 11, the viewpoint determination unit 52 calculates the three-dimensional position of the barycenter of the main object of the previous frame on the world coordinate system on the basis of held 3D data of the main object of the previous frame. Furthermore, the viewpoint determination unit 52 calculates the three-dimensional position of the barycenter of the main object of the current frame on the world coordinate system on the basis of 3D data of the main object of the current frame (processing target frame) supplied from the object determination unit 51.

At step S52, the viewpoint determination unit 52 calculates, on the basis of the three-dimensional position calculated at step S51 and held virtual viewpoint information of the previous frame, positions at which the barycenters of the main objects of the previous frame and the current frame are projected on a depth image of a processing target virtual camera.

At step S53, the viewpoint determination unit 52 determines the viewpoint of the processing target virtual camera of the current frame by moving the viewpoint of the processing target virtual camera of the previous frame by a movement amount from the position of the barycenter of the previous frame to the position of the barycenter of the current frame, which are calculated at step S52.

At step S54, the viewpoint determination unit 52 generates the external parameter, the internal parameter, and the camera ID of the virtual camera of the viewpoint determined at step S53, and supplies the external parameter, the internal parameter, and the camera ID to the color image generation unit 53, the depth image generation unit 54, and the storage unit 23.

At step S55, the viewpoint determination unit 52 holds the external parameter, the internal parameter, and the camera ID generated at step S54. Then, the process returns to step S13 in FIG. 9, and proceeds to step S14.

Figure 12:
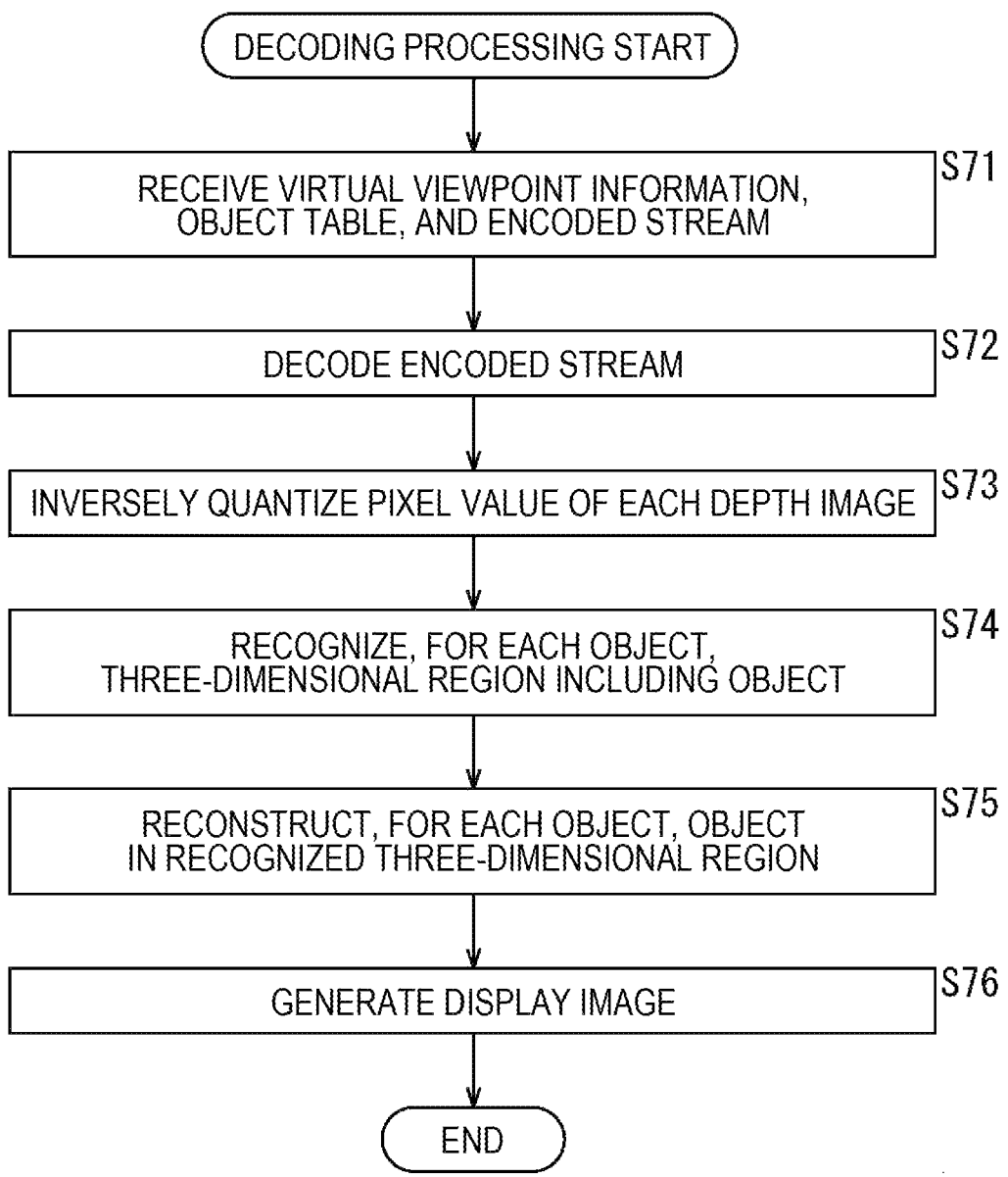
FIG. 12 is a flowchart for description of decoding processing.

FIG. 12 is a flowchart for description of the decoding processing by the decoding device 13 in FIG. 1. The decoding processing is started, for example, when the encoded stream, the virtual viewpoint information, and the object table are transmitted from the transmission unit 24 of the encoding device 12 for each frame.

At step S71 in FIG. 12, the reception unit 31 of the decoding device 13 receives the virtual viewpoint information, the object table, and the encoded stream transmitted from the transmission unit 24 of the encoding device 12. The reception unit 31 supplies the virtual viewpoint information and the object table to the reconstruction unit 33, and supplies the encoded stream to the decoding unit 32.

At step S72, the decoding unit 32 decodes the encoded stream supplied from the reception unit 31 in a scheme corresponding to the encoding scheme at the encoding unit 22. The decoding unit 32 supplies the color image and the depth image of each object of each virtual camera, which are obtained as a result, to the reconstruction unit 33.

At step S73, the reconstruction unit 33 obtains the distance z by inversely quantizing the pixel value of each depth image supplied from the decoding unit 32 on the basis of the minimum value zmin and the maximum value zmax of the object table supplied from the reception unit 31.

At step S74, the reconstruction unit 33 recognizes, for each object, a three-dimensional region including the object on the world coordinate system on the basis of the object table and the virtual viewpoint information.

At step S75, the reconstruction unit 33 reconstructs each object in the three-dimensional region recognized at step S74 on the basis of the distance z corresponding to each pixel of the depth image of the object, the color image, and the virtual viewpoint information. The reconstruction unit 33 supplies 3D data of the reconstructed object to the drawing unit 34.

At step S76, similarly to the conversion unit 21, the drawing unit 34 generates, on the basis of the display viewpoint information and the 3D data of each object supplied from the reconstruction unit 33, a color image obtained through image capturing of all objects at the display viewpoint as a display image. The drawing unit 34 supplies the display image to the display device 14.

As described above, the encoding device 12 generates the depth image of each object. Thus, the range of the distance z in each depth image is equal to or smaller than the range of the distance z in the depth image of the entire 3D model. Accordingly, the accuracy of a 3D model depth image improves as compared to a case where a depth image of the entire 3D model is generated.

Furthermore, the encoding device 12 generates the object range information of each object. Thus, the decoding device 13 can recognize, for each object, a three-dimensional region including the object on the world coordinate system on the basis of the object range information and the virtual viewpoint information of the object. Accordingly, the decoding device 13 can reconstruct each object with the three-dimensional region including the object as a processing region. As a result, a load of the object reconstruction processing is reduced as compared to a case where the processing region is the entire image capturing region of a virtual camera on the world coordinate system.

Second Embodiment (Exemplary Configuration of Conversion Unit)

The configuration of the image processing system to which the present disclosure is applied according to a second embodiment is the same as the configuration of the image processing system 10 in FIG. 1 except for the configuration of the conversion unit 21 and the configuration of the object table. Thus, description of components other than the conversion unit 21 will be omitted below as appropriate.

Figure 13:
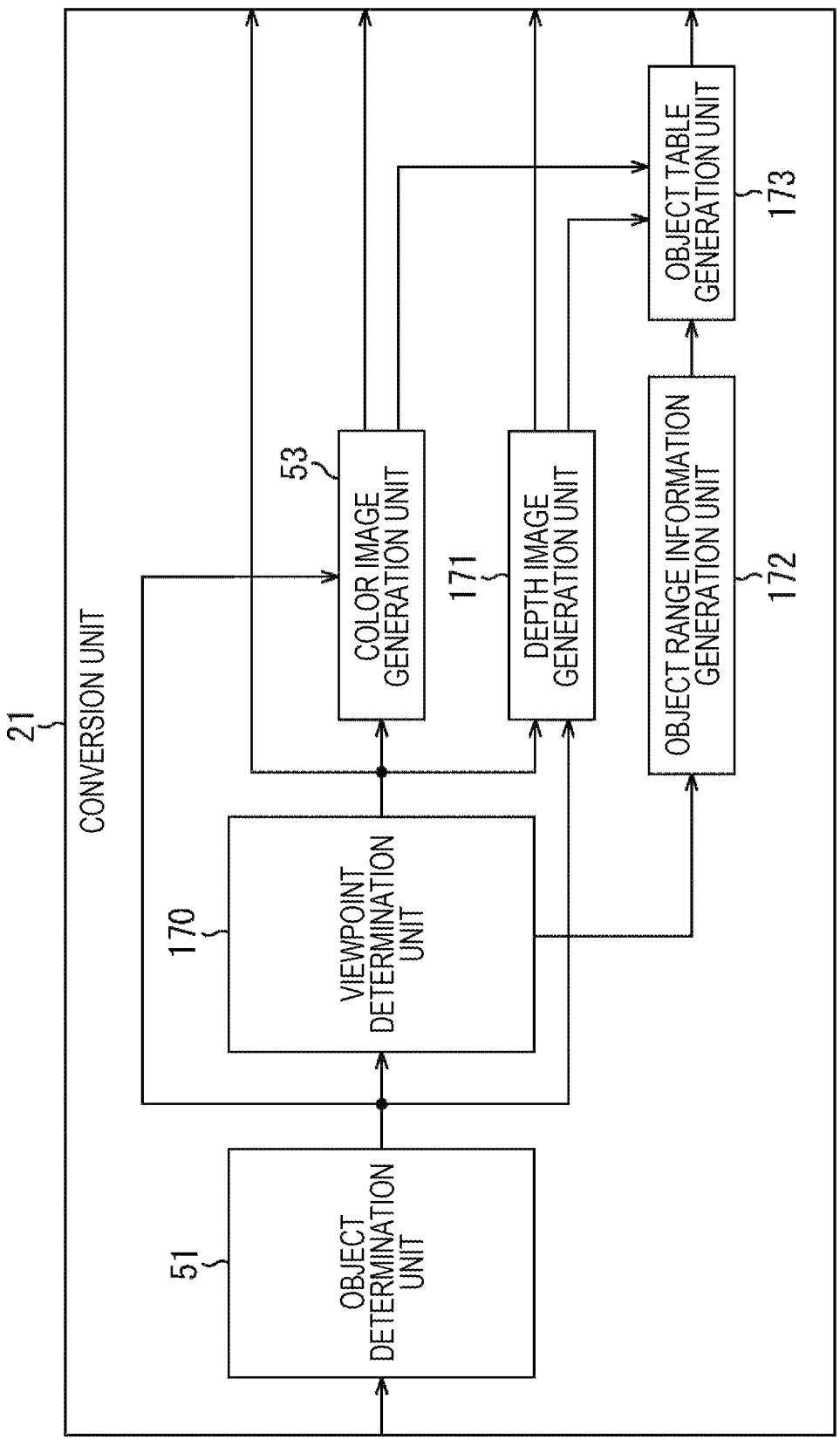
FIG. 13 is a block diagram illustrating an exemplary configuration of the conversion unit in the image processing system to which the present disclosure is applied according to a second embodiment.

FIG. 13 is a block diagram illustrating an exemplary configuration of the conversion unit 21 in the image processing system to which the present disclosure is applied according to the second embodiment.

In the configuration illustrated in FIG. 13, any component same as that in the configuration illustrated in FIG. 2 is denoted by the same reference sign. Duplicate description is omitted as appropriate.

The configuration of the conversion unit 21 in FIG. 13 is different from the configuration in FIG. 2 in that a viewpoint determination unit 170, a depth image generation unit 171, an object range information generation unit 172, and an object table generation unit 173 are provided in place of the viewpoint determination unit 52, the depth image generation unit 54, the object range information generation unit 55, and the object table generation unit 56, respectively. The conversion unit 21 in FIG. 13 generates, as the object range information, information indicating the range of the bounding box of each object on the world coordinate system.

Specifically, similarly to the viewpoint determination unit 52 in FIG. 2, the viewpoint determination unit 170 of the conversion unit 21 in FIG. 13 performs the main object selection processing in FIG. 10 and the viewpoint determination processing in FIG. 11. The viewpoint determination unit 170 supplies minimum and maximum values of each of the X, Y, and Z coordinates of the bounding box of each object produced on the world coordinate system through the processing at step S32 in FIG. 10 to the object range information generation unit 172 in association with the object ID of the object.

The depth image generation unit 171 generates a depth image of each virtual camera for each object on the basis of the 3D data of the object supplied from the object determination unit 51 and the virtual viewpoint information supplied from the viewpoint determination unit 52. The depth image generation unit 171 supplies the depth image of each object of each virtual camera to the encoding unit 22 in FIG. 1. Furthermore, the depth image generation unit 171 applies a depth image ID to each depth image. The depth image generation unit 171 supplies the depth image ID of the depth image of each object of each virtual camera, the camera ID of the virtual camera, and the object ID of the object in association to the object table generation unit 173.

The object range information generation unit 172 generates, as the object range information of each object, a minimum value Xmin and a maximum value Xmax of the X coordinate, a minimum value Ymin and a maximum value Ymax of the Y coordinate, and a minimum value Zmin and a maximum value Zmax of the Z coordinate of the object, which are supplied from the viewpoint determination unit 170. The object range information generation unit 172 supplies the object range information of each object and the object ID of the object in association to the object table generation unit 173.

The object table generation unit 173 generates an ID table in which the color image ID and the depth image ID corresponding to an object ID and a camera ID are registered in association with the object ID and the camera ID. Furthermore, the object table generation unit 173 generates a range table in which the object ID and the object range information supplied from the object range information generation unit 172 are registered while associating the object ID with the object range information. The object table generation unit 173 supplies, as the object table, the ID table and the range table to the storage unit 23 in FIG. 1.

(Exemplary Object Bounding Box)

Figure 14:
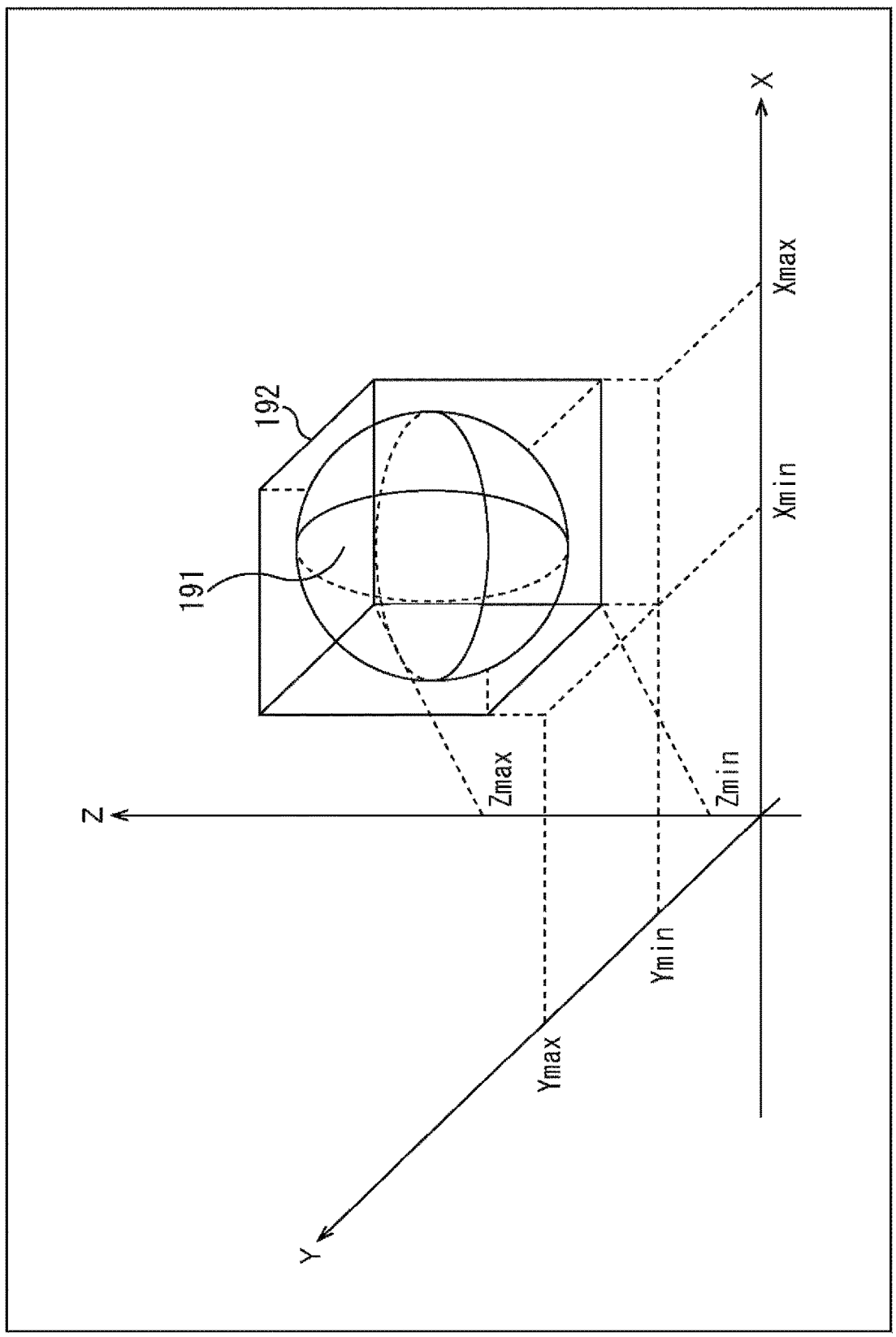
FIG. 14 is a diagram illustrating an exemplary object bounding box.

FIG. 14 is a diagram illustrating an exemplary object bounding box generated by the viewpoint determination unit 170 in FIG. 13.

As illustrated in FIG. 14, a bounding box 192 of an object 191 is a rectangular parallelepiped (including a cube) generated being in contact with the object and including, for example, two sides parallel to each of the X direction, the Y direction, and the Z direction. The minimum value Xmin and the maximum value Xmax of the X coordinate, the minimum value Ymin and the maximum value Ymax of the Y coordinate, and the minimum value Zmin and the maximum value Zmax of the Z coordinate of the bounding box 192 are the object range information of the object 191.

(Exemplary Object Table)

FIG. 15 is a diagram illustrating an exemplary object table generated by the object table generation unit 173 in FIG. 13.

Note that a camera ID, an object ID, a depth image ID, and a color image ID in the example of FIG. 15 are the same as those in the example of FIG. 8.

As illustrated in FIG. 15, the object table generated by the object table generation unit 173 includes an ID table in A of FIG. 15 and a range table in B of FIG. 15.

The ID table in A of FIG. 15 is similar to the object table in FIG. 8 except that no object range information is registered. In other words, the depth image ID and the color image ID are registered to the ID table in A of FIG. 15 in association with the camera ID and the object ID.

The minimum value Xmin, the maximum value Xmax, the minimum value Ymin, the maximum value Ymax, the minimum value Zmin, and the maximum value Zmax of the bounding box of the object of the object ID are registered as the object range information in association with the object ID to the range table in B of FIG. 15.

The decoding device 13 can recognize the three-dimensional region of the bounding box of each object on the world coordinate system on the basis of each object range information registered to the range table. Furthermore, the decoding device 13 can recognize the color image and the depth image of each object on the basis of the color image ID and the depth image ID registered to the ID table in association with the object ID.

Thus, the decoding device 13 can reconstruct each object with the recognized three-dimensional region on the world coordinate system as a processing region by using the depth image and the color image of the object. Accordingly, an object can be easily reconstructed as compared to a case where the object is reconstructed with the entire image capturing region of a virtual camera on the world coordinate system as a processing region.

Furthermore, the decoding device 13 can calculate the minimum value zmin and the maximum value zmax of the distance z in each depth image on the basis of each object range information and each virtual viewpoint information registered to the range table. Thus, the decoding device 13 can inversely quantize the pixel value of each depth image into the distance z on the basis of the calculated minimum value zmin and maximum value zmax.

(Description of Processing of Image Processing System)

Figure 16:
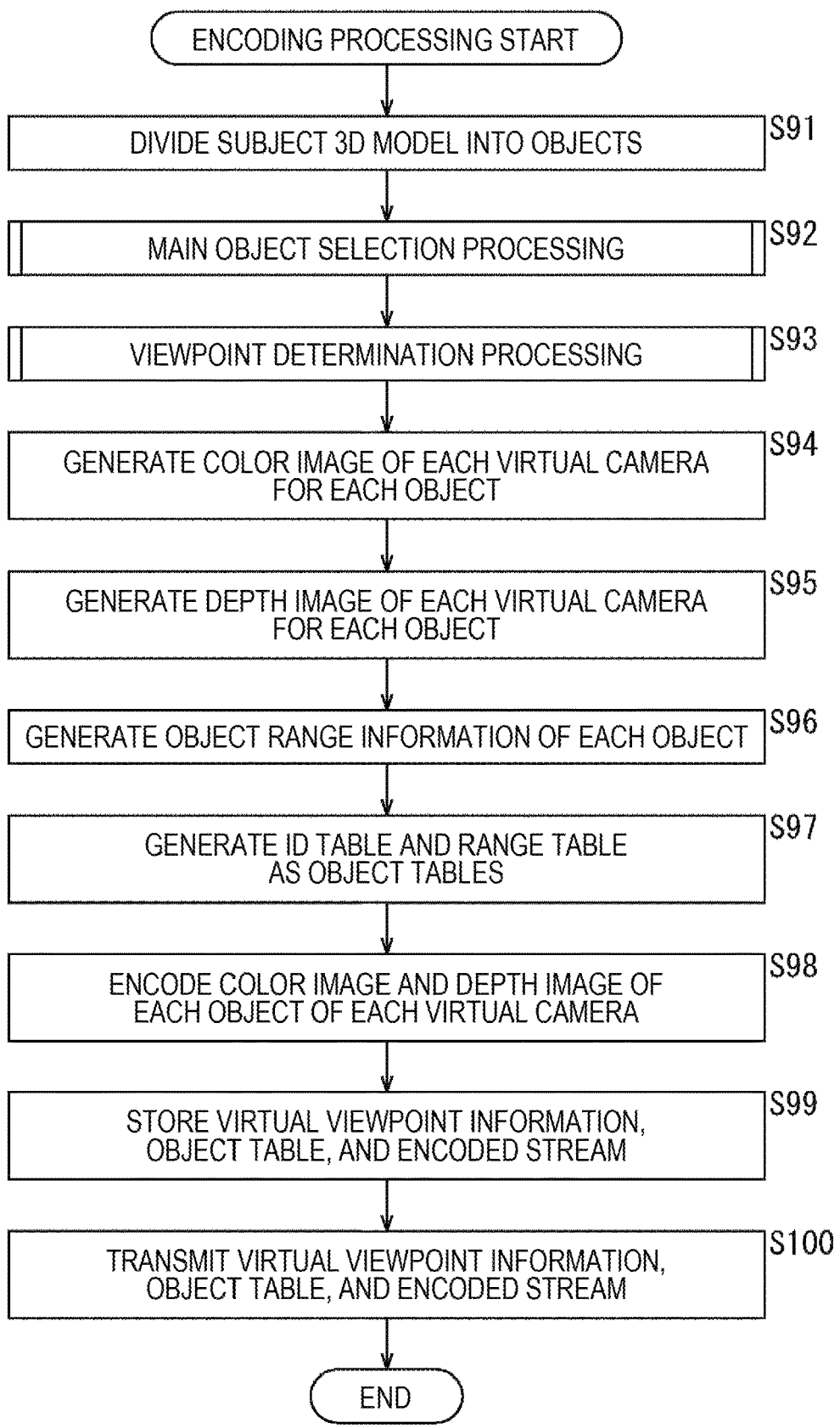
FIG. 16 is a flowchart for description of encoding processing in the second embodiment.

FIG. 16 is a flowchart for description of encoding processing by the encoding device 12 in the image processing system to which the present disclosure is applied according to the second embodiment. This encoding processing is started, for example, when 3D data of each frame is supplied from the image capturing device 11.

Processing at steps S91 to S94 in FIG. 16 is similar to the processing at steps S11 to S14 in FIG. 9, and thus description thereof is omitted.

At step S95, the depth image generation unit 171 generates a depth image of each virtual camera for each object on the basis of the 3D data of the object supplied from the object determination unit 51 and the virtual viewpoint information supplied from the viewpoint determination unit 52. The depth image generation unit 171 supplies the depth image of each object of each virtual camera to the encoding unit 22. Furthermore, the depth image generation unit 171 applies a depth image ID to each depth image. The depth image generation unit 171 supplies the depth image ID of the depth image of each object of each virtual camera, the camera ID of the virtual camera, and the object ID of the object in association to the object table generation unit 173.

At step S96, the object range information generation unit 172 generates, as the object range information of each object, the minimum value Xmin, the maximum value Xmax, the minimum value Ymin, the maximum value Ymax, the minimum value Zmin, and the maximum value Zmax of the bounding box of the object, which is produced through the processing at step S92. The object range information generation unit 172 supplies the object range information of each object and the object ID of the object in association to the object table generation unit 173.

At step S97, the object table generation unit 173 generates, as the object table, an ID table and a range table, and supplies the ID table and the range table to the storage unit 23.

Processing at steps S98 to S100 is similar to the processing at steps S20 to S22 in FIG. 9, and thus description thereof is omitted.

Note that, in the first and second embodiments, the same virtual viewpoint information is determined for all objects, but the virtual viewpoint information may be determined for each object. In this case, the viewpoint determination unit 52 determines, for each object, the viewpoint of a depth image of the current frame on the basis of 3D data of the object of the current frame, 3D data of the previous frame, and the virtual viewpoint information so that temporal change of the position of the object on a depth image of each viewpoint decreases.

Furthermore, the viewpoint determination unit 52 may determine the main object to be an object having the largest number of surfaces (faces) of polygons constituting an object among a plurality of objects.

Third Embodiment (Description of Computer to which Present Disclosure is Applied)

The above-described series of processing may be executed by hardware or software. In a case where the series of processing is executed by software, a computer program constituting the software is installed on a computer. The computer may be a computer incorporated in dedicated hardware, or a general-purpose personal computer or the like capable of executing various functions when various computer programs are installed thereon, for example.

Figure 17:
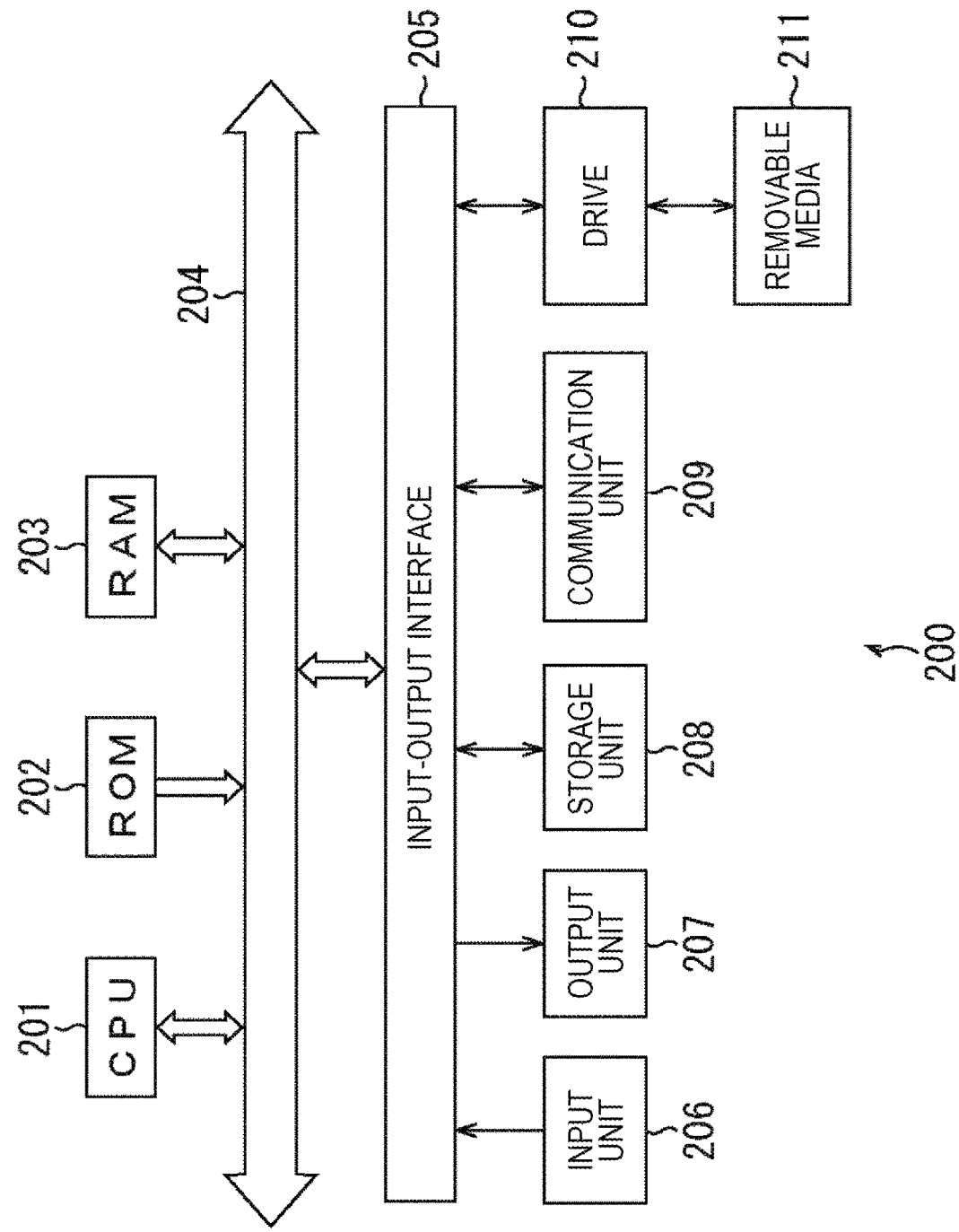
FIG. 17 is a block diagram illustrating an exemplary computer hardware configuration.

FIG. 17 is a block diagram illustrating an exemplary configuration of hardware of a computer configured to execute the above-described series of processing through a computer program.

In a computer 200, a central processing unit (CPU) 201, a read only memory (ROM) 202, and a random access memory (RAM) 203 are connected with each other through a bus 204.

The bus 204 is further connected with an input-output interface 205. The input-output interface 205 is connected with an input unit 206, an output unit 207, a storage unit 208, a communication unit 209, and a drive 210.

The input unit 206 is achieved by a keyboard, a mouse, a microphone, or the like. The output unit 207 is achieved by a display, a speaker, or the like. The storage unit 208 is achieved by a hard disk, a non-transitory memory, or the like. The communication unit 209 is achieved by a network interface or the like. The drive 210 drives a removable media 211 such as a magnetic disk, an optical disk, a magneto optical disc, or a semiconductor memory.

In the computer 200 configured as described above, the above-described series of processing is performed when the CPU 201 loads the computer program stored in, for example, the storage unit 208 onto the RAM 203 through the input-output interface 205 and the bus 204 and executes the computer program.

The computer program executed by the computer 200 (CPU 201) may be, for example, recorded in the removable media 211 as a package media or the like and provided. Furthermore, the computer program may be provided through wired and wireless transmission media such as a local area network, the Internet, and digital satellite broadcast.

In the computer 200, the computer program may be installed on the storage unit 208 through the input-output interface 205 when the removable media 211 is mounted on the drive 210. Furthermore, the computer program may be received by the communication unit 209 through wired and wireless transmission media and installed on the storage unit 208. Alternatively, the computer program may be installed on the ROM 202 or the storage unit 208 in advance.

Note that the computer program executed by the computer 200 may be a computer program processed in a temporally sequential manner in the order of description in the present specification, or may be a computer program processed in parallel or at a necessary timing upon a call or the like.

<Exemplary Application>

The technology according to an embodiment of the present disclosure is applicable to various products. For example, the technology according to an embodiment of the present disclosure may be achieved as a device mounted on any kinds of moving objects such as an automobile, an electric vehicle, a hybrid electric vehicle, a motorcycle, a bicycle, a personal mobility, an airplane, a drone, a ship, a robot, a construction machine, and an agriculture machine (tractor).

FIG. 18 is a block diagram illustrating an exemplary schematic configuration of a vehicle control system 7000 as an exemplary moving object control system to which the technology according to an embodiment of the present disclosure is applicable. The vehicle control system 7000 includes a plurality of electronic control units connected with each other through a communication network 7010. In the example illustrated in FIG. 18, the vehicle control system 7000 includes a drive system control unit 7100, a body system control unit 7200, a battery control unit 7300, an exterior information detection unit 7400, an interior information detection unit 7500, and an integration control unit 7600. The communication network 7010 connecting these plurality of control units may be an on-board communication network compliant with an optional standard such as a controller area network (CAN), a local interconnect network (LIN), a local area network (LAN), or a FlexRay (registered trademark).

Each control unit includes a microcomputer configured to perform arithmetic processing in accordance with various computer programs, a storage unit configured to store, for example, computer programs executed by the microcomputer and parameters used for various calculation, and a drive circuit configured to drive various kinds of control target devices. Each control unit includes a network I/F for performing communication with another control unit through the communication network 7010, and a communication I/F for performing communication with a device, sensor, or the like in or out of a vehicle through wired communication or wireless communication. FIG. 18 illustrates, as functional configurations of the integration control unit 7600, a microcomputer 7610, a general-purpose communication I/F 7620, a dedicated communication I/F 7630, a positioning unit 7640, a beacon reception unit 7650, an interior instrument I/F 7660, a voice image output unit 7670, an on-board network I/F 7680, and a storage unit 7690. Similarly, any other control unit includes a microcomputer, a communication I/F, a storage unit, and the like.

The drive system control unit 7100 controls device operations related to the drive system of a vehicle in accordance with various computer programs. For example, the drive system control unit 7100 functions as a control device of, for example, a drive power generation device such as an internal combustion or a drive motor configured to generate drive power of the vehicle, a drive power transmission mechanism configured to transfer the drive power to wheels, a steering mechanism configured to adjust the angle of the vehicle, and a braking device configured to generate braking force of the vehicle. The drive system control unit 7100 may have the function of a control device of, for example, an antilock brake system (ABS) or an electronic stability control (ESC).

The drive system control unit 7100 is connected with a vehicle state detection unit 7110. The vehicle state detection unit 7110 includes, for example, a gyro sensor configured to detect the angular velocity of axial rotation motion of the vehicle body, an acceleration sensor configured to detect acceleration of the vehicle, and at least one of sensors configured to detect, for example, the operation amount of the acceleration pedal, the operation amount of the brake pedal, the steering angle of the steering wheel, the engine rotation speed, and the rotational speed of the wheels. The drive system control unit 7100 performs arithmetic processing by using a signal input from the vehicle state detection unit 7110, and controls an internal combustion, a drive motor, an electric power steering device, a brake device, and the like.

The body system control unit 7200 controls operations of various devices mounted on the vehicle body in accordance with various computer programs. For example, the body system control unit 7200 functions as a control device of a keyless entry system, a smart key system, a power window device, and various lamps such as a head lamp, a back lamp, a brake lamp, an indicator, and a fog lamp. In this case, the body system control unit 7200 may receive radio wave emitted by a portable device as an alternative key or various switch signals. The body system control unit 7200 receives inputting of the radio wave or signals and controls a door lock device, a power window device, a lamp, and the like of the vehicle.

The battery control unit 7300 controls a secondary battery 7310 as an electrical power supply source of the drive motor in accordance with various computer programs. For example, the battery control unit 7300 receives information such as the battery temperature, the battery output voltage, or the battery remaining capacity from a battery device including the secondary battery 7310. The battery control unit 7300 performs arithmetic processing by using these signals, and controls adjustment of the temperature of the secondary battery 7310, or a cooling device or the like included in the battery device.

The exterior information detection unit 7400 detects information regarding the outside of the vehicle on which the vehicle control system 7000 is mounted. For example, the exterior information detection unit 7400 is connected with at least one of an image capturing section 7410 or an exterior information detection section 7420. The image capturing section 7410 includes at least one of a time of flight (ToF) camera, a stereo camera, a single-lens camera, an infrared camera, or any other camera. The exterior information detection section 7420 includes, for example, at least one of an environment sensor for detecting current weather or climate or a circumference information detection sensor for detecting any other vehicle, an obstacle, a pedestrian, or the like around the vehicle on which the vehicle control system 7000 is mounted.

For example, the environment sensor may be at least one of a raindrop sensor configured to detect rain, a mist sensor configured to detect mist, a sunshine sensor configured to detect the degree of sunshine, or a snowflake sensor configured to detect snowfall. The circumference information detection sensor may be at least one of an ultrasonic sensor, a radar device, or a light detection and ranging, laser imaging detection and ranging (LIDAR) device. These image capturing section 7410 and the exterior information detection section 7420 may be provided as independent sensors or devices, or may be provided as devices in which a plurality of sensors or devices are integrated.

Here, FIG. 19 illustrates exemplary installation positions of the image capturing section 7410 and the exterior information detection section 7420. The image capturing units 7910, 7912, 7914, 7916, and 7918 are provided at, for example, at least one of the positions of the front nose, the side mirrors, the rear bumper, the backdoor, and an upper part of the windshield inside of a vehicle 7900. The image capturing unit 7910 provided to the front nose and the image capturing unit 7918 provided to the upper part of the windshield inside the vehicle mainly acquire images on the front side of the vehicle 7900. The image capturing units 7912 and 7914 provided to the side mirrors mainly acquire images on sides of the vehicle 7900. The image capturing unit 7916 provided to the rear bumper or the backdoor mainly acquires an image on the back side of the vehicle 7900. The image capturing unit 7918 provided to the upper part of the windshield inside the vehicle is mainly used to detect, for example, a preceding vehicle, a pedestrian, an obstacle, a traffic light, a traffic sign, and a lane.

Note that FIG. 19 illustrates exemplary image capturing ranges of the image capturing units 7910, 7912, 7914, and 7916. Image capturing range a indicates the image capturing range of the image capturing unit 7910 provided to the front nose, image capturing ranges b and c indicate the image capturing ranges of the image capturing units 7912 and 7914 provided to the side mirrors, and image capturing range d indicates the image capturing range of the image capturing unit 7916 provided to the rear bumper or the backdoor. For example, image data captured by the image capturing units 7910, 7912, 7914, and 7916 is placed over to obtain a bird's-eye view image of the vehicle 7900 when viewed from above.

Exterior information detection sections 7920, 7922, 7924, 7926, 7928, and 7930 provided at front, rear, sides, corners, and an interior upper part of the windshield of the vehicle 7900 may be each, for example, an ultrasonic wave sensor or a radar device. The exterior information detection sections 7920, 7926, and 7930 provided at the front nose, the rear bumper, the backdoor, and the interior upper part of the windshield of the vehicle 7900 may be each, for example, a LIDAR device. These exterior information detection sections 7920 to 7930 are mainly used for detection of a preceding vehicle, a pedestrian, an obstacle, and the like.

The description continues returning to FIG. 18. The exterior information detection unit 7400 causes the image capturing section 7410 to capture an exterior image and receives the captured image data. In addition, the exterior information detection unit 7400 receives detection information from the exterior information detection section 7420 connected therewith. In a case where the exterior information detection section 7420 is an ultrasonic wave sensor, a radar device, or a LIDAR device, the exterior information detection unit 7400 emits, for example, ultrasonic wave or electromagnetic wave, and receives information of received reflected wave. The exterior information detection unit 7400 may perform, on the basis of the received information, object detection processing or distance detection processing of a person, a car, an obstacle, a sign, a character on a road surface, and the like. The exterior information detection unit 7400 may perform, on the basis of the received information, environment recognition processing of recognizing rainfall, fog, a road surface status, and the like. The exterior information detection unit 7400 may calculate the distance to an exterior object on the basis of the received information.

In addition, the exterior information detection unit 7400 may perform, on the basis of the received image data, image recognition processing or distance detection processing of recognizing a person, a car, obstacle, a sign, a character on a road surface, and the like. The exterior information detection unit 7400 may perform processing such as distortion correction or positioning on the received image data, and may synthesize the image data with image data captured by another image capturing section 7410 to generate a bird's-eye view image or a panoramic image. The exterior information detection unit 7400 may perform viewpoint conversion processing by using image data captured by another image capturing section 7410.

The interior information detection unit 7500 detects interior information. The interior information detection unit 7500 is connected with, for example, a driver state detection unit 7510 configured to detect the state of the driver. The driver state detection unit 7510 may include, for example, a camera configured to capture an image of the driver, a living body sensor configured to detect living body information of the driver, or a microphone configured to collect interior voice. The living body sensor is provided to, for example, a seat surface, the steering wheel, or the like, and detects living body information of a passenger sitting on the seat or the driver holding the steering wheel. On the basis of detection information input from the driver state detection unit 7510, the interior information detection unit 7500 may calculate the fatigue degree or concentration degree of the driver or may determine whether or not the driver is asleep. The interior information detection unit 7500 may perform processing such as noise canceling processing on a collected voice signal.

The integration control unit 7600 controls the entire operation in the vehicle control system 7000 in accordance with various computer programs. The integration control unit 7600 is connected with an input unit 7800. The input unit 7800 is achieved by a device, such as a touch panel, a button, a microphone, a switch, or a lever, through which an input operation can be performed by a passenger. The integration control unit 7600 may receive data acquired through voice recognition of voice input through a microphone. The input unit 7800 may be, for example, a remote control device using infrared or other radio wave, or an external connection instrument such as a cellular phone or a personal digital assistant (PDA) capable of operating according to the vehicle control system 7000. The input unit 7800 may be, for example, a camera, which allows the passenger to input information through gesture. Alternatively, data obtained by detecting motion of a wearable device worn by the passenger may be input. Furthermore, the input unit 7800 may include, for example, an input control circuit or the like configured to generate an input signal on the basis of information input by a passenger or the like through the above-described input unit 7800 and output the input signal to the integration control unit 7600. The passenger or the like operates the input unit 7800 to input various kinds of data or give an instruction for a processing operation to the vehicle control system 7000.

The storage unit 7690 may include a read only memory (ROM) configured to store various computer programs executed by the microcomputer, and a random access memory (RAM) configured to store, for example, various parameters, calculation results, or sensor values. In addition, the storage unit 7690 may be achieved by, for example, a magnetic storage device such as a hard disc drive (HDD), a semiconductor storage device, an optical storage device, or a magneto-optical storage device.

The general-purpose communication I/F 7620 is a general-purpose communication I/F configured to mediate communication with various instruments present in an external environment 7750. The general-purpose communication I/F 7620 may implement a cellular communication protocol such as global system of mobile communications (GSM), WiMAX, long term evolution (LTE) or LTE-advanced (LTE-A), or any other wireless communication protocol of wireless LAN (also referred to as Wi-Fi (registered trademark)), Bluetooth (registered trademark), or the like. The general-purpose communication I/F 7620 may be connected with an instrument (for example, an application server or a control server) on an external network (for example, the Internet, a cloud network, or a network unique to a business operator) through a base station or an access point, for example. In addition, the general-purpose communication I/F 7620 may be connected with a terminal (for example, a terminal of a driver, a pedestrian, or a shop, or a machine type communication (MTC) terminal) near the vehicle by using, for example, a peer-to-peer (P2P) technology.

The dedicated communication I/F 7630 is a communication I/F that supports a communication protocol formulated for use in a vehicle. The dedicated communication I/F 7630 may implement a standard protocol such as wireless access in vehicle environment (WAVE), dedicated short range communications (DSRC), or cellular communication protocol as combination of IEEE802.11p of the lower-level layer and IEEE1609 of the higher-level layer. The dedicated communication I/F 7630 typically performs V2X communication as a concept including one or more of vehicle-to-vehicle communication, vehicle-to-infrastructure communication, vehicle-to-home communication, and vehicle-to-pedestrian communication.

The positioning unit 7640 receives, for example, global navigation satellite system (GNSS) signals from GNSS satellites (for example, global positioning system (GPS) signals from GPS satellites), executes positioning, and generates position information including the latitude, longitude, and altitude of the vehicle. Note that the positioning unit 7640 may specify the current position through signal interchange with a wireless access point, or may acquire position information from a terminal such as a cellular phone, a PHS, or a smartphone having a positioning function.

The beacon reception unit 7650 receives, for example, radio wave or electromagnetic wave emitted from a wireless station or the like installed on a road, and acquires information such as the current position, a traffic jam, a road closing, or a required traveling time. Note that the function of the beacon reception unit 7650 may be included in the dedicated communication I/F 7630 described above.

The interior instrument I/F 7660 is a communication interface configured to mediate connection between the microcomputer 7610 and various interior instruments 7760 in the vehicle. The interior instrument I/F 7660 may establish wireless connection by using a wireless communication protocol such as wireless LAN, Bluetooth (registered trademark), near field communication (NFC), or wireless USB (WUSB). Furthermore, the interior instrument I/F 7660 may establish wired connection such as universal serial bus (USB), high-definition multimedia interface (HDMI), or mobile high-definition link (MHL) through a connection terminal (not illustrated) (and a cable, as needed). The interior instruments 7760 may include, for example, at least one of a mobile device or a wearable instrument owned by a passenger, or an information instrument conveyed into or attached to the vehicle. In addition, the interior instruments 7760 may include a navigation device configured to search for a path to an optional destination. The interior instrument I/F 7660 exchanges a control signal or a data signal with the interior instruments 7760.

The on-board network I/F 7680 is an interface configured to mediate communication between the microcomputer 7610 and the communication network 7010. The on-board network I/F 7680 communicates a signal or the like according to a predetermined protocol supported by the communication network 7010.

The microcomputer 7610 of the integration control unit 7600 controls the vehicle control system 7000 in accordance with various computer programs on the basis of information acquired through at least one of the general-purpose communication I/F 7620, the dedicated communication I/F 7630, the positioning unit 7640, the beacon reception unit 7650, the interior instrument I/F 7660, or the on-board network I/F 7680. For example, the microcomputer 7610 may calculate a control target value of a drive power generation device, a steering mechanism, or a braking device on the basis of acquired interior and exterior information, and may output a control command to the drive system control unit 7100. For example, the microcomputer 7610 may perform cooperative control to implement the function of an advanced driver assistance system (ADAS) including, for example, collision avoidance or impact reduction of the vehicle, following travel based on the inter-vehicular distance, vehicle speed maintaining travel, vehicle collision warning, or vehicle lane deviation warning. In addition, the microcomputer 7610 may perform cooperative control to achieve, for example, automated driving in which the vehicle autonomously travels independently from an operation by the driver, by controlling the drive power generation device, the steering mechanism, the braking device, and the like on the basis of acquired information around the vehicle.

The microcomputer 7610 may generate information regarding the three-dimensional distance between the vehicle and a surrounding object such as a structure or a person on the basis of information acquired through at least one of the general-purpose communication I/F 7620, the dedicated communication I/F 7630, the positioning unit 7640, the beacon reception unit 7650, the interior instrument I/F 7660, or the on-board network I/F 7680, and may produce local map information including information around the current position of the vehicle. Furthermore, the microcomputer 7610 may predict danger such as collision of the vehicle, approaching of a pedestrian or the like, or entry to a closed road on the basis of the acquired information, and may generate a warning signal. The warning signal may be, for example, a signal for generating warning sound or turning on a warning lamp.

The voice image output unit 7670 transmits at least one of a voice output signal or an image output signal to an output device capable of visually or audibly notifying a passenger in the vehicle or the outside of the vehicle of information. In the example illustrated in FIG. 18, the output device is an audio speaker 7710, a display unit 7720, and an instrument panel 7730. The display unit 7720 may include, for example, at least one of an on-board display or a head-up display. The display unit 7720 may have an augmented reality (AR) display function. The output device may be, in place of these devices, another device including a wearable device such as a headphone or a spectacle display worn by the passenger, a projector, a lamp, or the like. In a case where the output device is a display device, the display device visually displays a result obtained through various kinds of processing performed by the microcomputer 7610 or information received from another control unit, in various formats of text, image, table, graph, and the like. In addition, in a case where the output device is a sound output device, the sound output device converts an audio signal including, for example, played-back voice data or acoustic data into an analog signal, and audibly outputs the signal.

Note that, in the example illustrated in FIG. 18, at least two control units connected with each other through the communication network 7010 may be integrated as one control unit. Alternatively, an individual control unit may include a plurality of control units. Furthermore, the vehicle control system 7000 may include another control unit (not illustrated). In addition, part or all of the function of any control unit in the above description may be achieved by another control unit. In other words, predetermined arithmetic processing may be performed at any control unit as long as information is transmitted and received through the communication network 7010. Similarly, a sensor or a device connected with any control unit may be connected with another control unit, and a plurality of control units may mutually transmit and receive detection information through the communication network 7010.

Note that a computer program for achieving each function of the image processing system 10 according to the present embodiment described with reference to FIGS. 1 to 16 may be mounted on any control unit or the like. Furthermore, a computer-readable recording medium storing such a computer program may be provided. The recording medium is, for example, a magnetic disk, an optical disk, a magneto optical disc, a flash memory, or the like. Furthermore, the above-described computer program may be distributed, for example, through a network without using a recording medium.

The image processing system 10 according to the present embodiment described with reference to FIGS. 1 to 16 in the vehicle control system 7000 described above can be applied to the above-described vehicle control system 7000 as the exemplary application illustrated in FIG. 18. For example, the image capturing device 11 of the image processing system 10 corresponds to the image capturing section 7410, the encoding device 12 and the decoding device 13 integrally correspond to the microcomputer 7610 and the storage unit 7690 of the integration control unit 7600, and the display device 14 corresponds to the display unit 7720.

Furthermore, at least some constituent elements of the image processing system 10 described with reference to FIGS. 1 to 16 may be achieved on a module (for example, an integrated circuit module including one die) for the integration control unit 7600 illustrated in FIG. 18. Alternatively, the image processing system 10 described with reference to FIGS. 1 to 16 may be achieved by the plurality of control units of the vehicle control system 7000 illustrated in FIG. 18.

In the present specification, a system means a set of a plurality of constituent elements (such as devices and modules (components)), whether or not all constituent elements are in the same housing is not problem. Thus, a plurality of devices housed in separate housings and connected with each other through a network, and one device in which a plurality of modules are housed in one housing are both systems.

Note that effects described herein are merely exemplary. The present technology is not limited to those effects, and may achieve any other effect.

Furthermore, embodiments of the present disclosure are not limited to the above-described embodiments, and various modifications are possible without departing from the gist of the present disclosure.

For example, the present disclosure may be achieved by cloud computing in which one function is distributively and cooperatively processed by a plurality of devices through a network.

Furthermore, each step in the above-described flowcharts may be executed by one device or may be distributively executed by a plurality of devices.

In addition, in a case where a plurality of processes are included in one step, the plurality of processes included in the one step may be executed by one device or may be distributively executed by a plurality of devices.

Note that the present disclosure may be configured as described below.

(1)
An image processing apparatus including a depth image generation unit configured to generate a depth image of each of a plurality of viewpoints for each object included in a 3D model.

(2)
The image processing apparatus according to (1), further including an object range information generation unit configured to generate object range information indicating a range of the object on the depth image and a range of a distance between a viewpoint corresponding to the depth image and the object in a depth direction.

(3)
The image processing apparatus according to (1), further including an object range information generation unit configured to generate object range information indicating a range of the object on a 3D coordinate system.

(4)
The image processing apparatus according to any one of (1) to (3), further including a viewpoint determination unit configured to determine the plurality of viewpoints on the basis of the temporally sequential 3D model so that temporal change of the position of a predetermined object on the depth image of each viewpoint decreases.

(5)
The image processing apparatus according to any one of (1) to (3), further including a viewpoint determination unit configured to determine, for each object, the plurality of viewpoints on the basis of the temporally sequential object so that temporal change of the position of the object on the depth image of each viewpoint decreases.

(6)
An image processing method including a depth image generation step of generating, by an image processing apparatus, a depth image of each of a plurality of viewpoints for each object included in a 3D model.

(7)
An image processing apparatus including an object generation unit configured to generate an object on the basis of a depth image of each of a plurality of viewpoints for the object included in a 3D model.

(8)
The image processing apparatus according to (7), in which the object generation unit generates an object on the basis of object range information indicating a range of an object on the depth image and a range of a distance between a viewpoint corresponding to the depth image and the object in a depth direction.

(9)
The image processing apparatus according to (7), in which the object generation unit generates the object on the basis of object range information indicating a range of the object on a 3D coordinate system.

(10)
The image processing apparatus according to any one of (7) to (9), in which the plurality of viewpoints are determined on the basis of the temporally sequential 3D model so that temporal change of the position of a predetermined object included in the 3D model on the depth image of each viewpoint decreases.

(11)
The image processing apparatus according to any one of (7) to (10), in which the plurality of viewpoints are determined on the basis of the temporally sequential object so that temporal change of the position of the object on the depth image of each viewpoint decreases.

(12)

The image processing apparatus according to any one of (7) to (11), in which the object is a predetermined object among all objects included in the 3D model.

(13)

An image processing method including an object generation step of generating, by an image processing apparatus, an object on the basis of a depth image of each of a plurality of viewpoints for the object included in a 3D model.

REFERENCE SIGNS LIST

12 Encoding device
13 Decoding device
33 Reconstruction unit
52 Viewpoint determination unit
54 Depth image generation unit
55 Object range information generation unit
90 3D model
91 to 93 Object
101 to 103 Depth image
170 Viewpoint determination unit
172 Object range information generation unit

The invention claimed is:

1. An image processing apparatus comprising:
circuitry configured to
   divide a 3D model into one or more objects,
   generate depth images from a plurality of viewpoints for a plurality of objects based on the divided 3D model for each object,
   generate object range information with respect to each viewpoint based on the generated depth images of each viewpoint for each object of the plurality of objects, the object range information indicating a two-dimensional position on the depth images and depth on the depth images, and
   transmit the generated depth images from the plurality of viewpoints and the generated object range information for the plurality of objects to an external decoding device,
wherein the generated object range information includes a minimum value and a maximum value in each dimension of at least two dimensions registered in association with each object with respect to each viewpoint.

2. The image processing apparatus according to claim 1, wherein the circuitry generates the object range information indicating a range of each respective object on the depth image and a range of a distance between each viewpoint corresponding to the depth image and the respective object in a depth direction.

3. The image processing apparatus according to claim 1, wherein the circuitry generates the object range information indicating a range of each object on a 3D coordinate system.

4. The image processing apparatus according to claim 1, wherein the circuitry is further configured to determine the plurality of viewpoints on a basis of the 3D model, and
   wherein the 3D model comprises a temporally sequential 3D model with the plurality of viewpoints determined so that temporal change of a position of a predetermined object of the plurality of objects on the depth image of each viewpoint decreases.

5. The image processing apparatus according to claim 1, wherein the circuitry is further configured to determine, for each object, the plurality of viewpoints on a basis of a selected temporally sequential object of the plurality of objects so that temporal change of the position of the selected temporally sequential object on the depth image of each viewpoint decreases.

6. The image processing apparatus according to claim 1, wherein the generated object range information includes the minimum value and the maximum value in each dimension of at least three dimensions registered in association with each object based on the plurality of viewpoints.

7. The image processing apparatus according to claim 1, wherein the circuitry is further configured to generate color images of each viewpoint of the plurality of viewpoints for each object of the plurality of objects based on the divided 3D model for each object.

8. An image processing method comprising:
   dividing a 3D model into one or more objects;
   generating, by an image processing apparatus, depth images from a plurality of viewpoints for a plurality of objects based on the divided 3D model for each object;
   generating object range information with respect to each viewpoint based on the generated depth images of each viewpoint for each object of the plurality of objects, the object range information indicating a two-dimensional position on the depth images and depth on the depth images; and
   transmitting the generated depth images from the plurality of viewpoints and the generated object range information for the plurality of objects to an external decoding device,
wherein the generated object range information includes a minimum value and a maximum value in each dimension of at least two dimensions registered in association with each object with respect to each viewpoint.

9. An image processing apparatus comprising:
circuitry configured to
   decide a three-dimensional region for a plurality of objects based on virtual viewpoint information,
   decide object range information for each object of the plurality of objects, the object range information indicating a two-dimensional position on the depth images and depth on the depth images, and
   reconstruct the plurality of objects, in the decided three-dimensional region, based on the virtual viewpoint information, depth images from a plurality of viewpoints for the plurality of objects, and color images for the plurality of objects,
wherein the decided object range information includes a minimum value and a maximum value in each dimension of at least two dimensions registered in association with each object with respect to each viewpoint.

10. The image processing apparatus according to claim 9, wherein the three-dimensional region is decided based on a range of each respective object on the depth image and a range of a distance between each viewpoint corresponding to the depth image and the respective object in a depth direction.

11. The image processing apparatus according to claim 9, wherein the three-dimensional region is decided based on a range of each object on a 3D coordinate system.

12. The image processing apparatus according to claim 9, wherein the plurality of viewpoints are determined on a basis of a 3D model of the plurality of objects, and
   wherein the 3D model comprises a temporally sequential 3D model with the plurality of viewpoints determined so that temporal change of a position of a predetermined object of the plurality of objects included in the 3D model on the depth image of each viewpoint decreases.

13. The image processing apparatus according to claim 9, wherein the plurality of viewpoints are determined on a basis of a selected temporally sequential object of the plurality of objects so that temporal change of the position of the selected temporally sequential object on the depth image of each viewpoint decreases.

14. The image processing apparatus according to claim 9, wherein the circuitry separately generates each object of the plurality of objects.

15. An image processing method comprising:
  deciding a three-dimensional region for a plurality of objects based on virtual viewpoint information;
  deciding object range information for each object of the plurality of objects, the object range information indicating a two-dimensional position on depth images and depth on the depth images; and
  reconstructing the plurality of objects, in the decided three-dimensional region, based on the virtual viewpoint information, the depth images from a plurality of viewpoints for the plurality of objects, and color images for the plurality of objects,
  wherein the decided object range information includes a minimum value and a maximum value in each dimension of at least two dimensions registered in association with each object with respect to each viewpoint.

* * * * *